(12) United States Patent
Macha et al.

(10) Patent No.: US 10,846,638 B1
(45) Date of Patent: Nov. 24, 2020

(54) PLATFORM INCLUDING A DECISION-SUPPORT SYSTEM PROVIDING AN INTERACTIVE INTERFACE INTO COST AND REVENUE ANALYSES AND FORECASTING THEREOF

(71) Applicant: Virtustream IP Holding Company LLC, Bethesda, MD (US)

(72) Inventors: Eloy F. Macha, Las Cruces, NM (US); Maik A. Lindner, Marietta, GA (US); Vincent G. Lubsey, Davenport, FL (US); Sean C. O'Brien, Atlanta, GA (US); Eduardo M. Rosa, Marietta, GA (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 324 days.

(21) Appl. No.: 15/798,704

(22) Filed: Oct. 31, 2017

(51) Int. Cl.
  *G06F 3/048* (2013.01)
  *G06Q 10/08* (2012.01)
  *G06Q 10/06* (2012.01)

(52) U.S. Cl.
  CPC ......... *G06Q 10/0633* (2013.01); *G06F 3/048* (2013.01); *G06Q 10/06313* (2013.01); *G06Q 10/06375* (2013.01); *G06Q 10/08* (2013.01)

(58) Field of Classification Search
  CPC .. G06Q 10/06; G06Q 10/103; G06Q 10/0633; G06Q 10/6313; G06Q 10/06311;
  (Continued)

(56) References Cited

U.S. PATENT DOCUMENTS

| 10,262,019 B1 | 4/2019 | Reiner et al. |
| 10,581,675 B1 | 3/2020 | Iyer |

(Continued)

OTHER PUBLICATIONS

Wikipedia, Business Process Model and Notation (BPMN), https://en.wikipedia.org/w/index.php?title=Business_Process_Model_and_Notation&oldid=804950746, Oct. 12, 2017.

(Continued)

*Primary Examiner* — Robert W Beausoliel, Jr.
*Assistant Examiner* — Pedro J Santos
(74) *Attorney, Agent, or Firm* — Ryan, Mason & Lewis, LLP

(57) ABSTRACT

An apparatus in one embodiment comprises a processing platform that includes a plurality of processing devices each comprising a processor coupled to a memory. The processing platform is configured to implement at least a portion of at least a first cloud-based system. The processing platform further comprises a smart agent engine configured to ingest datasets and related workflows in connection with service delivery operations and normalize the ingested datasets and workflows. The processing platform further comprises an analytics engine configured to generate metrics by applying machine learning algorithms to the normalized datasets and workflows, and generate an enhanced version of the normalized datasets and/or workflows by encompassing at least one inset and/or outflow based on the metrics and one or more algorithms. Also, the processing platform further comprises a decision support module configured to output the ingested datasets, the ingested workflows, and the enhanced dataset and/or workflow.

20 Claims, 17 Drawing Sheets

(58) Field of Classification Search
CPC .......... G06Q 10/06375; G06Q 10/0631; G06F 9/5038
See application file for complete search history.

(56) References Cited

U.S. PATENT DOCUMENTS

| | | | | |
|---|---|---|---|---|
| 2008/0306798 | A1* | 12/2008 | Anke | G06F 8/61 705/7.26 |
| 2011/0138050 | A1 | 6/2011 | Dawson | |
| 2011/0238458 | A1* | 9/2011 | Purcell | G06F 9/5072 705/7.27 |
| 2011/0265081 | A1 | 10/2011 | Lucovsky | |
| 2012/0005236 | A1 | 1/2012 | Deng | |
| 2012/0016778 | A1 | 1/2012 | Salle | |
| 2012/0147894 | A1 | 6/2012 | Mulligan | |
| 2012/0239739 | A1 | 9/2012 | Manglik | |
| 2013/0066940 | A1 | 3/2013 | Shao | |
| 2013/0173918 | A1 | 7/2013 | Saraswat | |
| 2013/0191218 | A1 | 7/2013 | Predescu | |
| 2013/0232463 | A1 | 9/2013 | Nagaraja | |
| 2013/0263209 | A1 | 10/2013 | Panuganty | |
| 2014/0143422 | A1 | 5/2014 | Joseph | |
| 2014/0278623 | A1 | 9/2014 | Martinez | |
| 2014/0337429 | A1* | 11/2014 | Asenjo | H04L 65/403 709/204 |
| 2016/0065417 | A1 | 3/2016 | Sapuram | |
| 2016/0337175 | A1 | 11/2016 | Rao | |
| 2018/0095778 | A1 | 4/2018 | Aydelott et al. | |
| 2018/0131583 | A1 | 5/2018 | Barrows | |
| 2018/0331928 | A1 | 11/2018 | Dave et al. | |
| 2019/0012149 | A1 | 1/2019 | Garza et al. | |
| 2019/0036789 | A1 | 1/2019 | Kaplunov et al. | |

OTHER PUBLICATIONS

Wikipedia, BPEL (Business Process Execution Language), https://en.wikipedia.org/w/index.php?title=Business_Process_Execution_Language&oldid=786392224, Jun. 19, 2017.

Wikipedia, Event-driven process chain (EPC), https://en.wikipedia.org/w/index.php?title=Event-driven_process_chain&oldid=771078397, Mar. 19, 2017.

Wikipedia, Architecture of Integrated Information Systems, https://en.wikipedia.org/w/index.php?title=Architecture_of_Integrated_Information_Systems&oldid=782492788, May 27, 2017.

Wikipedia, AWS Lambda, https://en.wikipedia.org/w/index.php?title=AWS_Lambda&oldid=790050312, Jul. 11, 2017.

E. Hormozi, H. Hormozi, M.K. Akbari and M.S. Javan, Using of Machine Learning into Cloud Environment (A Survey): Managing and Scheduling of Resources in Cloud Systems, 2012 Seventh International Conference on P2P, Parallel, Grid, Cloud and Internet Computing, Victoria, BC, 2012, pp. 363-368 (Year: 2012).

* cited by examiner

```
public class Decision Cost Support service {
    public string name = 0;
    public string description = 0;
    public int cost = 0;
    public int optimization = 0;

//constructor
    public service (string name "Cost Component", string description "Execute Activity -Upgrade Task", int cost 100, int optimization initial) {
        name = "Service Component - Activity";
        description = "Execute Activity -Upgrade Task";
        cost = 100;
        optimization = initial;
    }
}
```

CONTINUED FROM FIG. 12A  /1200

```
{
    "$schema": "Ingress of cost components per product per service line per contract for Decision Support System",
    "contentVersion": "1.0",
    "parameters": {
        "<parameter-name>": {
            "type": "Cost Component",
            "defaultValue": Service Component No 1 from Service Line No 1,
        }
    },
    "triggers": [ { "trigger-name": {
            "type": Cost Support Optimization,
            "inputs": { settings },
            "recurrence": {
                "frequency": "Hour",
                "conditions": [ check Service Component Cost],
        }} ], "actions": [ { "Update Service Component Cost": {
            "type": "Service Component - Activity",
            "inputs": {
                "method": "PUT",
                "uri": "New Cost Component"
            } }
            "type": "Optimization",
            "inputs": {
                "method": "PUT",
                "uri": "Optimized v1"
                }
        }} ],
    "outputs": {
        "optimized cost component": {
        "value": "Optimized %date% %costmodel%",
        }
    }
}
```

US 10,846,638 B1

PLATFORM INCLUDING A DECISION-SUPPORT SYSTEM PROVIDING AN INTERACTIVE INTERFACE INTO COST AND REVENUE ANALYSES AND FORECASTING THEREOF

FIELD

The field relates generally to information processing systems, and more particularly to techniques for providing cloud services implemented using virtual resources in information processing systems.

BACKGROUND

Information processing systems increasingly utilize reconfigurable virtual resources to meet changing user needs. For example, cloud computing and storage systems implemented using virtual machines have been widely adopted. Such cloud-based systems include, for example, Amazon Web Services (AWS), Google Cloud Platform (GCP), and Microsoft Azure. Despite the widespread availability of these and numerous other private, public and hybrid cloud offerings, there exists a significant problem in conventional practice in that there is no adequate mechanism available for compiling and understanding real costs and real-time efficiencies (or lack of) in service operations. Existing approaches commonly focus on gathering datasets in disparate forms through homegrown approaches or single-aspect applications. Additionally, such approaches are typically manually managed through labor-consuming efforts, which present risks of error and discrepancies feeding into the datasets.

SUMMARY

Illustrative embodiments of the present invention provide information processing systems configured to provide an interactive interface into service delivery operations analysis driven by ingestion of dynamic datasets through smart agents and an analytics framework, delivering a real-time view into costs, revenue and forecasting thereof to be used as a decision support system.

In one embodiment, an apparatus comprises a processing platform that includes a plurality of processing devices each comprising a processor coupled to a memory. The processing platform is configured to implement at least a portion of at least a first cloud-based system. The processing platform further comprises a smart agent engine configured to ingest, in real-time, one or more datasets and one or more workflows related to the one or more datasets generated in connection with at least one service delivery operation of one or more service provider organizations, and normalize the ingested datasets and the ingested workflows into a given format. The processing platform further comprises an analytics engine configured to automatically generate one or more metrics related to the at least one service delivery operation by applying one or more machine learning algorithms to the normalized datasets and the normalized workflows, and automatically generate an enhanced version of at least one of the normalized datasets and normalized workflows by encompassing at least one of one or more insets and one or more outflows based on the one or more generated metrics and at least one of one or more deep learning algorithms and one or more machine learning algorithms. Additionally, the processing platform further comprises a decision support module configured to output to at least one user the ingested datasets, the ingested workflows, and the enhanced version of at least one of the normalized datasets and normalized workflows.

Illustrative embodiments can provide significant advantages relative to conventional enterprise cloud computing platforms. For example, challenges associated with the limitations of manually-managed and/or single-focused applications are overcome by capturing real-time access to all operating metrics tied to internal and external service delivery operations within an organization, and providing augmentation and automation assistance to generate real-time views into service provider costs and providing tools around revenue and forecasting analysis.

These and other illustrative embodiments described herein include, without limitation, methods, apparatus, systems, and computer program products comprising processor-readable storage media.

BRIEF DESCRIPTION OF THE DRAWINGS

FIG. 12A and FIG. 12B show example pseudocode for handling the optimization identification of cost components associated with a service component activity in an illustrative embodiment.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous other system configurations are possible in other embodiments.

Figure 1:
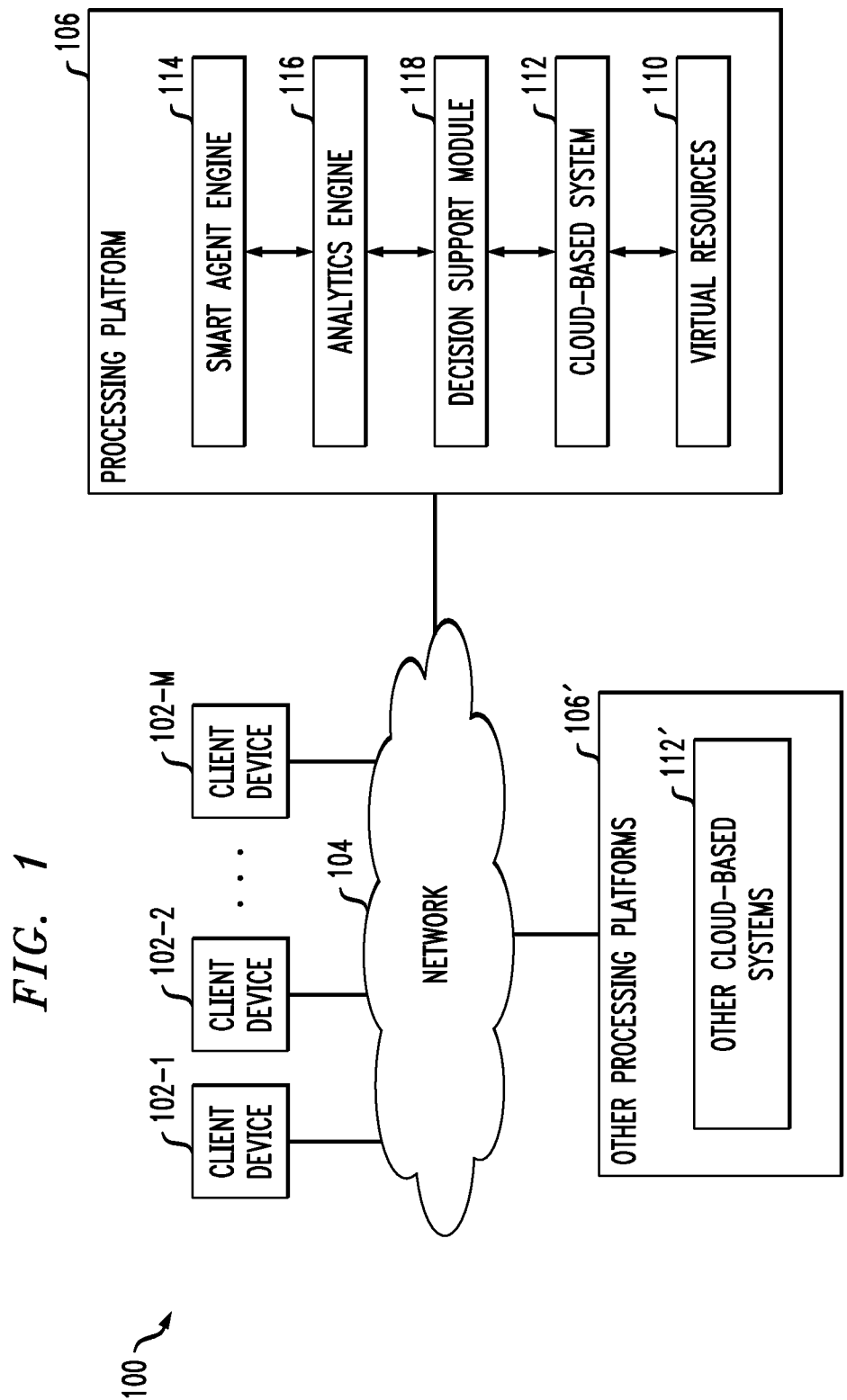
FIG. 1 is a block diagram of an information processing system configured for cloud resource planning in an illustrative embodiment.

FIG. 1 shows an information processing system 100 configured in accordance with an illustrative embodiment of the present invention. The information processing system 100 comprises a plurality of client devices 102-1, 102-2, . . . 102-M coupled via a network 104 to a processing platform 106.

The client devices 102 in this embodiment can comprise, for example, desktop, laptop or tablet computers, mobile telephones, or other types of processing devices capable of communicating with the processing platform 106 over the network 104. Clients associated with the respective client devices 102 are assumed to run respective sets of client applications utilizing corresponding sets of virtual resources 110 of at least one cloud-based system 112 provided by the processing platform 106. For example, such clients may be respective tenants of a cloud data center or other type of multi-tenant environment provided by the processing platform 106. These tenants or other clients are examples of what are more generally referred to herein as respective "users" of the processing platform 106. Such users are also intended to include customers of a cloud service provider.

In some embodiments, the virtual resources 110 comprise a plurality of containers allocable to respective client applications under the control of the cloud-based system 112. Additional or alternative virtual resources that may be used in a given embodiment include virtual machines. For example, the virtual resources may comprise a plurality of virtual machines allocable to respective ones of the client applications under the control of the cloud-based system 112. Various combinations of containers, virtual machines and other virtual resources may be used in other embodiments. For example, virtual resources may comprise containers running in virtual machines.

The network 104 over which the client devices 102 and the processing platform 106 communicate illustratively comprises one or more networks including, for example, a global computer network such as the Internet, a wide area network (WAN), a local area network (LAN), a satellite network, a telephone or cable network, a cellular network, a wireless network implemented using a wireless protocol such as Wi-Fi or WiMAX, or various portions or combinations of these and other types of communication networks.

The processing platform 106 is assumed to include a plurality of processing devices each having a processor coupled to a memory, and is configured to implement the virtual resources 110 of the cloud-based system 112 for use by client applications.

The processing platform 106 further comprises a smart agent engine 114, an analytics engine 116, and a decision support module 118, each associated with the cloud-based system 112. The cloud-based system 112 is also referred to herein as simply a "cloud."

Examples of different types of clouds that may be utilized in illustrative embodiments include private, public and hybrid clouds. Private clouds illustratively include on-premises clouds and off-premises clouds, where "premises" refers generally to a particular site or other physical location of the business, enterprise, organization or other entity that utilizes the private cloud. Public clouds are assumed to be off-premises clouds. Hybrid clouds comprise combinations of public and private cloud aspects and thus may include various combinations of on-premises and off-premises portions, such as on-premises placement of managed appliances that can be consumed on-demand like off-premises cloud capacity, but at the same time offer the benefits of on-premises deployments such as security, compliance and physical control.

The smart agent engine 114 is configured to ingest, in real-time, one or more datasets and one or more workflows related to the one or more datasets generated in connection with at least one service delivery operation of one or more service provider organizations, and also to normalize the ingested datasets and the ingested workflows into a given format. The analytics engine 116 is configured to automatically generate one or more metrics related to the at least one service delivery operation by applying one or more machine learning algorithms to the normalized datasets and the normalized workflows, and also to automatically generate an enhanced version of at least one of the normalized datasets and normalized workflows by encompassing at least one of one or more insets and one or more outflows based on the one or more generated metrics and at least one of one or more deep learning algorithms and one or more machine learning algorithms. The decision support module 118 is configured to output to at least one user the ingested datasets, the ingested workflows, and the enhanced version of at least one of the normalized datasets and normalized workflows.

An exemplary process utilizing smart agent engine 114, analytics engine 116, and decision support module 118 of the processing platform 106 in information processing system 100 will be described in more detail with reference to the flow diagram of FIG. 15.

Also, by way of example, in some embodiments, a different cloud-based system comprises another cloud-based system implemented with cloud-based system 112 on the processing platform 106. Alternatively, the different cloud-based system can comprise another cloud-based system 112' implemented on a different processing platform 106' coupled to the network 104.

It is to be appreciated that the particular processing platform configuration illustrated in the FIG. 1 embodiment is presented by way of example only, and that other embodiments can utilize other arrangements of additional or alternative components. For example, functionality disclosed herein as being associated with two or more separate components can in other embodiments be combined into a single component.

A more particular example of an additional component that can be included in the processing platform 106 is a resource abstraction layer. Such a resource abstraction layer may be associated with the cloud-based system 112 and may comprise one or more resource abstraction frameworks such as a Mesos framework or a Cloud Foundry Diego framework. A given such framework can be configured to abstract away underlying virtual resources 110 from client applications that utilize those virtual resources.

As mentioned previously, the virtual resources 110 implemented by the processing platform 106 illustratively comprise containers. Such containers are more particularly assumed to comprise respective Docker containers or other types of Linux containers (LXCs). In embodiments that utilize containers, the processing platform 106 illustratively comprises a plurality of container host devices each implementing one or more of the containers. Each of the container host devices illustratively comprises at least one processor coupled to a memory. Such container host devices are examples of what are more generally referred to herein as "processing devices."

In some embodiments, Docker containers or other types of LXCs may be implemented on one or more Linux processing devices using Linux kernel control groups ("cgroups"). However, it is to be appreciated that embodiments of the present invention are not restricted to use with Docker containers or any other particular type of containers. Accordingly, numerous other techniques can be used in implementing containers in a given embodiment, and such techniques do not necessarily require use of the Linux cgroup feature. Clusters of containers can be managed across multiple container host devices of the processing platform 106 using container cluster managers such as Docker Swarm or Kubernetes. Such cluster managers may be implemented within or in association with the cloud-based system 112.

The processing platform 106 can also incorporate one or more container engines, such as one or more Docker engines. By way of example, a given Docker engine may be preconfigured to run on CoreOS, an open source lightweight operating system based on the Linux kernel and particularly configured to provide functionality for deploying applications in containers. Another example of a lightweight operating system suitable for use in implementing at least portions of the processing platform 106 in some embodiments is VMware® Photon OS™ which has a relatively small footprint and is designed to boot extremely quickly on VMware® platforms.

The processing platform 106 in some embodiments incorporates additional functionality, such as management and orchestration functionality. The management and orchestration functionality may be implemented, for example, in the cloud-based system 112 or components thereof, and can be provided, for example, using components such as VCE Vision™ Intelligent Operations Software, or other types of management and orchestration components, including components from Pivotal Cloud Foundry, or various combinations of multiple ones of these or other components.

In some embodiments, certain functionality of the cloud-based system 112 is made available to a user by a cloud service provider on a Software-as-a-Service (SaaS) basis. Such users may be associated with respective ones of the client devices 102 and may correspond to respective tenants of the cloud service provider.

However, the term "user" in this context and elsewhere herein is intended to be more broadly construed so as to encompass, for example, human, hardware, software or firmware entities, as well as various combinations of such entities.

It should be understood that the particular arrangements of system and platform components as illustrated in FIG. 1 are presented by way of example only. In other embodiments, only subsets of these system and platform components, or additional or alternative sets of components, may be used, and such components may exhibit alternative functionality and configurations.

Examples of processing platforms that may be used to implement at least portions of the processing platform 106 of the FIG. 1 embodiment will be described in more detail below in conjunction with FIGS. 16 and 17. A given such processing platform comprises at least one processing device comprising a processor coupled to a memory, and the processing device may be implemented at least in part utilizing one or more virtual machines or other virtualization infrastructure. Additionally, the operation of the information processing system 100 will be described in further detail with reference to the flow diagram of FIG. 15.

In order to understand true or real costs and current efficiencies (or lack of) in service delivery operations, a service provider organization would preferably have real-time access to operating metrics tied to each of its operating groups providing both internal and external services within the organization. In at least one embodiment of the invention, via modeling business and service workflows, and thereby identifying datasets that each group ingests and produces, smart agents can take such operating metrics as inputs and (through an analytics framework) provide augmentation and automation assistance. Such augmentation and automation assistance can further result in generating and providing a real-time view into the service provider organization's costs, as well as providing tools around revenue and forecasting analysis. Based on such outputs, at least one embodiment of the invention implements a decision support system which provides guidance on what actions to take on based on decision drivers derived from the ingested datasets.

As further detailed herein, at least one embodiment of the present invention includes gathering all datasets, insets/outflows, and workflows generated by each servicing operations group within a service provider organization. Additionally, one or more embodiments of the invention can include developing smart agents (such as, for example, a deep learning agent, a voice assist agent, a data augmentation agent, a data automation agents, etc.) which ingest gathered datasets and normalize the datasets (as further illustrated, for example, in FIG. 14). The normalized datasets can be consumed, for example, by an analytics engine and a machine learning engine, which can output one or more desired metrics.

At least one embodiment of the invention can also include providing an interactive dashboard for each of one or more actors, customized based on the role(s) and permission(s) attributed to the actor. One or more embodiments of the invention can additionally include demonstrating, through one or more machine learning algorithms, potential efficiencies of the resulting datasets based on desired targets for a given time period, forecasted by algorithms, around one or more defined objectives. Such an embodiment can further provide a decision support system with augmented software agents using deep learning algorithms, as well as provide metrics, as outputs to one or more actors as assistance in overall service provider decision making outcomes.

By way merely of illustration and not limitation, consider the following exemplary use cases for one or more embodiments of the invention. For instance, a support operations group manager can view current use/efficiencies of underlying operations group(s), such as, for example, real-time consumption of labor resources assigned to various engagements. By way of another example, a capacity and management manager can view consumption of hardware resources (such as compute, storage, network and associated equipment) in various or individual data centers (DCs) involved in the delivery of service provider service(s) offering(s) based on real-time and forecasted consumption metrics, service(s) onboarding phases and service(s) release phases.

Also, a finance manager, for example, can view current costs for product offerings and sub-components thereof, as well as view, confirm and/or adjust operating margins for each sub-component or overall offering, and identify gaps in efficiency in cost-drives for each sub-component. Further, such a user can determine efficiencies in long-term engagements wherein sub-component costs are improved for the duration of the modeled engagement.

By way of additional example, an architecture manager can validate and/or confirm designs are using current/real-time models and only needed components are included in the solution minimizing overhead and under-utilization for each design/solution. Further, group leaders and/or an executive leadership team (ELT) can view end-to-end life-cycles and operations in real-time and confirm the forecasted models meet expectations.

Also, as detailed herein, cloud resource planning (CRP), within which one or more embodiments of the invention are implemented, can provide integrated multi-cloud management for flexibility in a multi-vendor cloud environment. At least one embodiment of the invention can include providing supply chain-oriented services for cloud product needs of an enterprise, as well as facilitating dynamic and automated processes to allow the enterprise to scale up and/or down from end-user clients, via communication capabilities, and into backend systems. Additionally, one or more embodiments of the invention can include implementing continuous and/or periodic improvements to an enterprise information technology landscape through use of artificial intelligence (AI) and deep learning during technical and business process execution.

Further, in one or more embodiments of the invention, design recommendations and landscape optimizations can be provided by CRP agents based on machine learning techniques (for example, via a recommendations system with smart AI-based agents). As additionally detailed herein, CRP provides frictionless cloud service processes across service providers (open to partners via shared application programming interfaces (APIs) and processes), as well as provides a single management console for technical and business units across an orchestrated cloud landscape.

Enterprise trends can be used to define required features for an implementation by CRP. For example, at least one embodiment of the invention can include implementation of AI and/or machine learning techniques on big data (landscape deployment and operations experience, for example) with forecasting capabilities. Also, one or more embodiments of the invention can include facilitating both an external and an internal perspective on operations.

As noted herein, open interfaces into the CRP platform allow for integration of external services, and therefore forming of new business and technical processes. External services can be plugged-in via an API, and a CRP workflow engine can help to connect the service pieces into a bigger process and enable a flow. Also, in one or more embodiments of the invention, the CRP platform is hardware-agnostic due to a holistic approach, which is independent from specific service providers as well as hardware providers. Core technologies and established practices such as, for example, IT landscape management, monitoring, troubleshooting, security management, and policy execution can be combined and brought onto a single process flow as services. At the same time, the platform is opened to partners and other service providers. In combination with underlying process execution support, one or more embodiments of the invention include enabling multi-provider, multi-cloud service provisioning and optimization of end-user IT processes.

Accordingly, and as further described herein, at least one embodiment of the invention can include automate ad hoc planning and execution of an end-user IT landscape via a CRP platform, wherein such an IT landscape can include one or more cloud services, one or more business processes, and one or more technical processes, in conjunction with available cloud resources. Additionally, as used herein, "ad hoc" planning and execution of an end-user IT landscape refers to a specific end-user selected or designed IT landscape, wherein the end-user is enabled (via the CRP platform) to deploy and/or implement particular cloud services, business process, technical processes and/or cloud resources with the single CRP platform based on the offerings and capabilities of the CRP platform.

Figure 2:
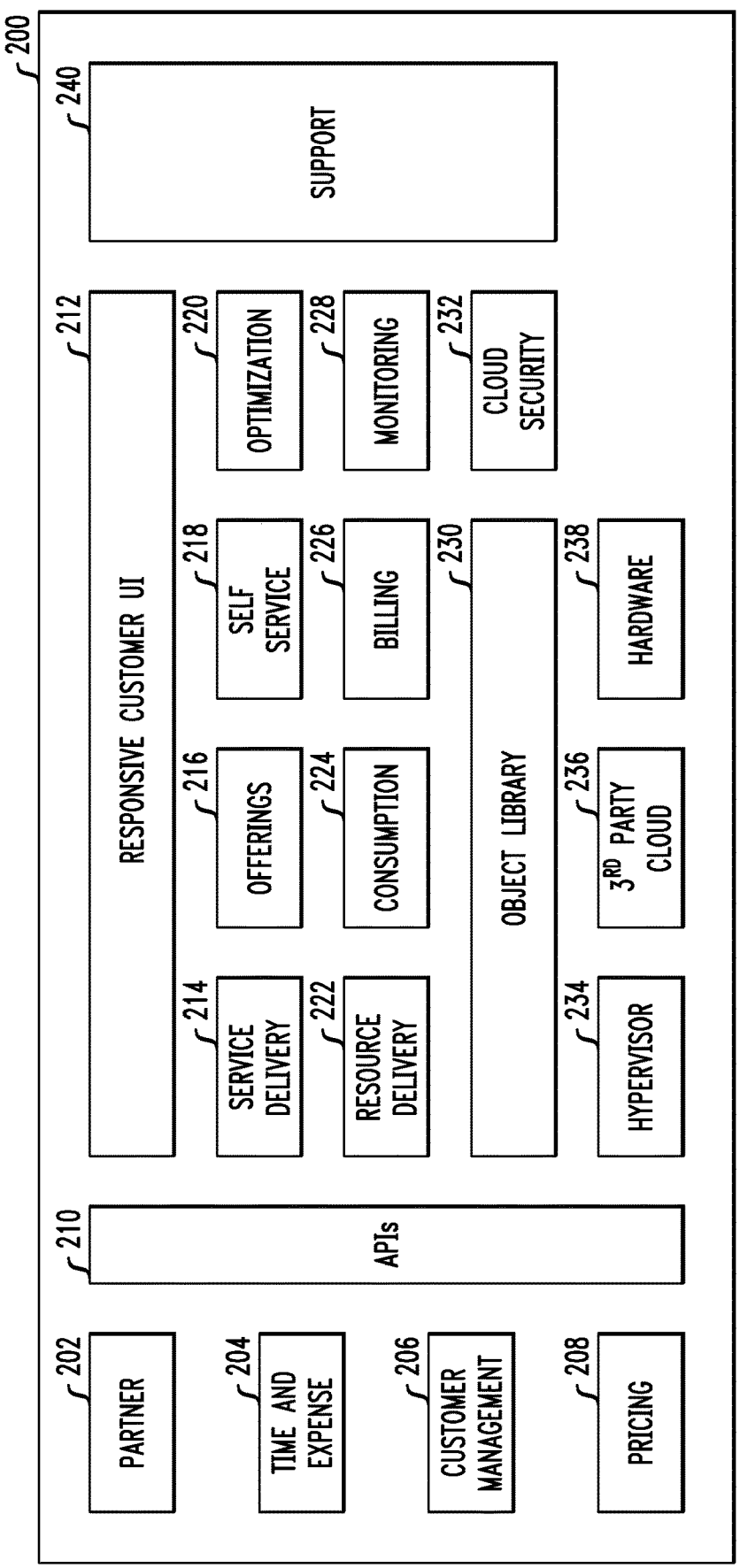
FIG. 2 shows an example cloud resource planning component overview in an illustrative embodiment.

FIG. 2 shows an example cloud resource planning component overview in an illustrative embodiment. By way of illustration, FIG. 2 depicts a CRP platform 200, which includes a partner component 202, a time and expense component 204, a customer management component 206, and a pricing component 208. The platform 200 also includes API componentry 210, a responsive customer user interface (UI) 212, and a support component 240. Further, the platform 200 includes a service delivery component 214, an offerings component 216, a self-service component 218, an optimization component 220, a resource delivery component 222, a consumption component 224, a billing component 226, and a monitoring component 228. Additionally, as depicted in FIG. 2, the CRP platform 200 includes an object library 230, a cloud security component 232, a hypervisor 234, a third party cloud component 236, and a hardware component 238.

As detailed herein, CRP can help an organization compose, execute, monitor, manage and optimize business-related services such as a cloud supply chain, procurement processes, inventory matters, finance matters, service life-cycles, projects, human resources and other components of a service fulfillment through a common dashboard. For example, a cloud service provider can utilize the CRP platform to enable ecosystem integration and leverage core expertise of a partner network for (complex) service composition. Also, in at least one embodiment of the invention, the CRP platform includes a role-dependent view of business and technical aspects of multi-cloud deployments.

Additionally, a customer can utilize the CRP platform, for example, to compose services internally, wherein such services can be enabled to leverage certain external components as business or technical needs dictate. Further, a vendor or independent service provider can utilize the CRP platform, for example, to offer a service or product for use in the platform, wherein such offerings can then be delivered to customers using the platform.

As illustrated in connection with FIG. 1 and also further described herein, one or more embodiments of the invention include a framework that includes incorporating technical services such as enterprise cloud service middleware, implemented business and technical processes, and flexible service module integration and technology utilization. Such a framework can also include a dynamic offering catalog, wherein such an offering catalog includes a service interface to allow for third parties to introduce offerings. The CRP platform can also maintain cross-service metadata pertaining to end-to-end technical and business processes, for example, to establish a consistent service provisioning across independent providers for service modules and technical cloud resources. In at least one embodiment of the invention, the inclusion of a logical cloud composition check supports the compatibility of service modules and consumed cloud resources, and virtual assistance and smart agents help to design comprehensive composed services based on enterprise cloud service design patterns.

Additionally, in one or more embodiments of the invention, the CRP platform provides functions and/or properties such as one or more catalogs, a user interface framework, a metadata repository, service registration, and general communication between service providers and end-users/consumers. The framework detailed herein can offer a single entry point in the form of a portal for role-based cloud service consumers and providers, wherein a single business and technical view is created across potentially independent services which rely on potentially dispersed infrastructure resources. Further, and by way of example, the CRP platform can define interfaces such as interfaces for integrating pricing capabilities from pricing engines, interfaces for integrating customer management from CRM systems, and interfaces for integrating billing systems.

Figure 3:
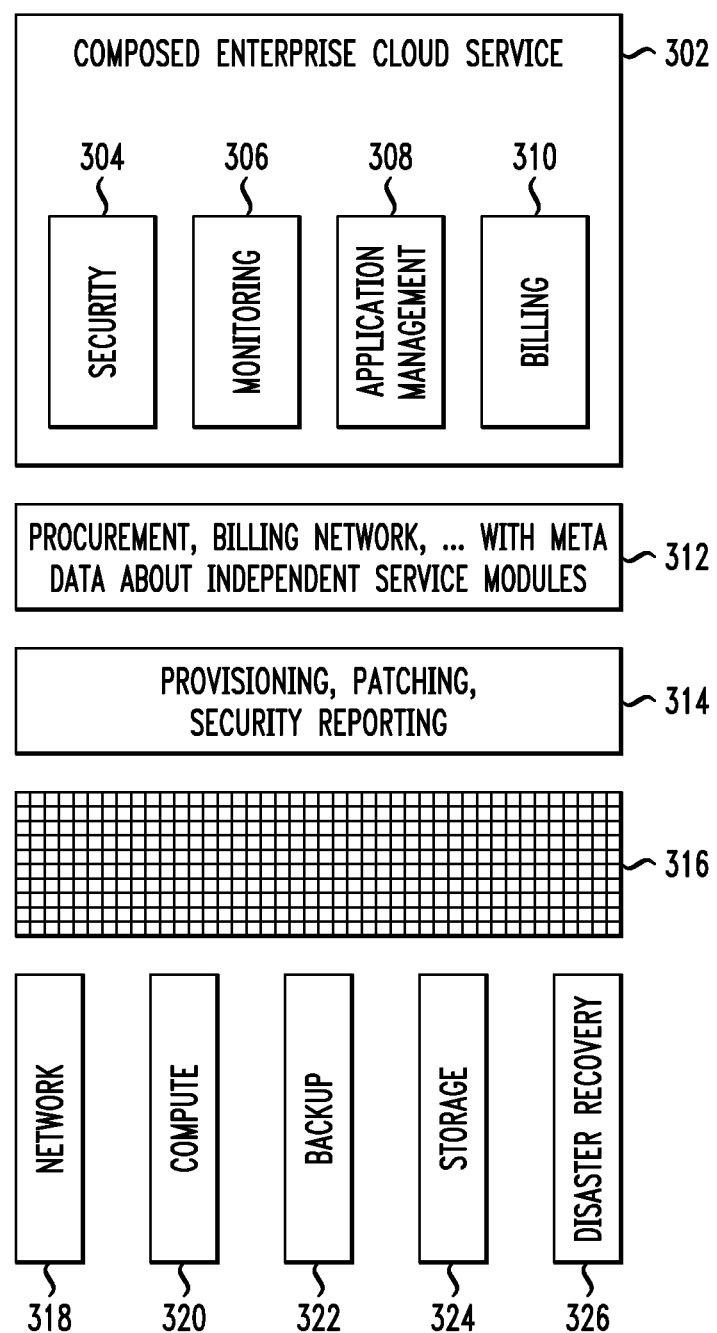
FIG. 3 shows an illustrative embodiment of an information processing system configured for cloud resource planning with multi-provider service composition in an illustrative embodiment.

FIG. 3 shows an illustrative embodiment of an information processing system configured for cloud resource planning with multi-provider service composition in an illustrative embodiment. By way of illustration FIG. 3 depicts a composed enterprise cloud service 302 which includes independent service modules 304 (a security service module), 306 (a monitoring service module), 308 (an application management service module), and 310 (a billing service module). Additionally, FIG. 3 depicts a business processes component 312, which can encompass business processes such as procurement, billing, network capabilities, etc., and which compiles metadata pertaining to the independent service modules 304, 306, 308 and 310. FIG. 3 also depicts a technical processes component 314, which can encompass technical processes such as provisioning, patching, security reporting, etc.

As also illustrated, FIG. 3 depicts technical integration adapters for technical resources, such as a network integration adapter 318, a computation integration adapter 320, a backup integration adapter 322, a storage integration adapter 324, and a disaster recovery integration adapter 326. Such technical integration adapters can enable efficient interaction with a multi-provider and multi-technology setup. As detailed in FIG. 3, interfaces to IT services such as, for example, compute, network and storage provisioning can be deployed in a structured and open interface style to allow for a wide ecosystem and business system integration.

FIG. 3 also depicts a service integration middleware 316, which serves as a bridge between the independent service modules, the business processes, the technical processes and integration adapters for technical resources. The service integration middleware 316 also facilitates communication and data management for the distributed services and processes across the CRP platform. Specifically, the service integration middleware 316 enables integration with multiple different underlying cloud technologies by allowing different modules from different providers to interact seamlessly via the CRP platform, even when those modules are functionally similar. For example, interactions between several different computation integration adapters (320) from several different providers (AWS, VMWare, etc.) can be integrated to service integration middleware 316 in a way that for technical processes component 314, those adapters present effectively the same behavior. Accordingly, one or more embodiments of the invention can include implementing and utilizing multiple different adapters; for example, one adapter for each function of each cloud.

Figure 4:
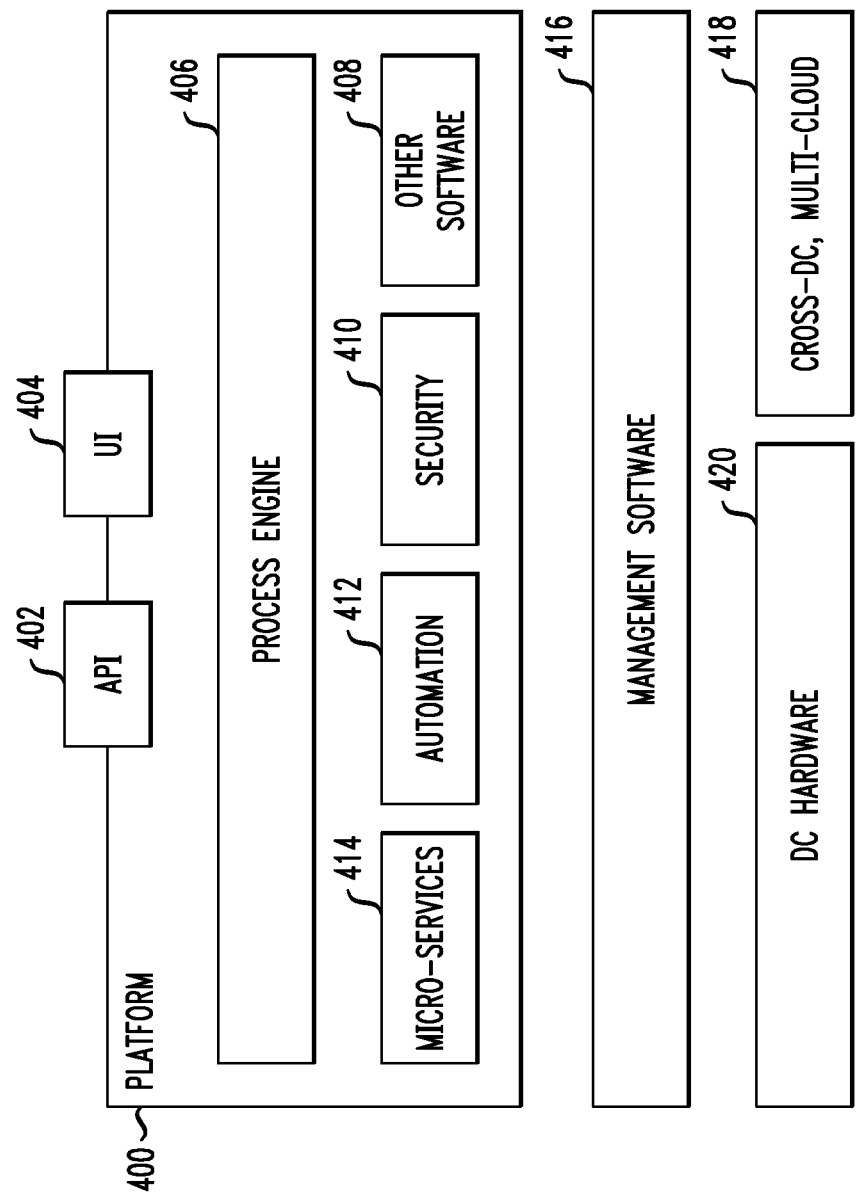
FIG. 4 shows cloud resource planning architecture in an illustrative embodiment.

FIG. 4 shows cloud resource planning architecture in an illustrative embodiment. By way of illustration, FIG. 4 depicts a CRP platform 400, which includes an API 402 and UI 404 for interaction with users. Additionally, the platform 400 includes a process engine 406 (which can incorporate AI functionality), a micro-services component 414, an automation component 412, a security component 410, and other software 408. FIG. 4 also depicts management software 416, data center (DC) hardware componentry 420, and cross-DC, multi-cloud componentry 418. The management software 416 can include low-level data center operations software, such as maintenance (patching, updating, upgrading), monitoring, auto-discovery, and software-defined-everything components. Such management software 416 can be hardware- and/or data center-specific, and therefore not part of the platform (as different servers can have different management software pieces with which they interact). As such, the management software 416 can communicate with the DC hardware 420 via one or more APIs and provide information (such as health status, general availability, etc.) about the DC hardware 420 up to the platform 400.

The cross-DC, multi-cloud componentry 418 facilitates platform communication between data centers, such as direct virtual private network (VPN) tunnels or multiprotocol label switching (MPLS) circuits. Via the multi-cloud aspect of component 418, the platform 400 can interact with a variety of types of clouds.

As illustrated in FIG. 4, at least one embodiment of the invention can include combining micro-services 414, automation components 412, security components 410, and other (standard off-the-shelf) software 408 into comprehensive value-creating processes. In one or more embodiments of the invention, AI-components in the process engine 406 allow for smart process execution, internally and externally. For example, CRP processes can include multi-cloud deployment optimization, as well as total cloud supply chain optimization. Such cloud supply chain optimization can include, for example, enhancing the supply chain by recommending new components, suppliers, etc.

Accordingly, via at least one embodiment of the invention, enterprise partners, suppliers and customers can experience the CRP platform as a one-stop portal for cloud products and the related lifecycle management of (complex) orchestrated landscapes. As detailed herein, customers can experience a cohesive monitoring and management plane for an entire IT landscape, with the CRP platform providing financial and technical views, as well as customer-specific optimization of IT-supported business. Also, a CRP platform can unite existing enterprise resource planning (ERP), customer relationship management (CRM), supply chain management (SCM), procurement, monitoring and customer support systems onto a single data and process plane.

As additionally detailed herein, in one or more embodiments of the invention, CRP-related IT tooling (such as data gathering, provisioning, troubleshooting, etc.) is hardware agnostic, and service support tools for provisioning and lifecycle support are infrastructure-independent. Similarly, in at least one embodiment of the invention, a CRP platform can support various cloud service deployment platforms and related infrastructure via APIs and vendor-provided plug-ins.

Further, one or more embodiments of the invention can include facilitating, via the CRP platform, scaling a business and related applications and services on-demand up or down across multi-cloud and multi-service environments. Such an embodiment can include implementing end-to-end process support via artificial intelligence, including functionality such as selecting optimal vendors, products and/or contracts, and suggesting collaboration partners from different and/or similar industries. Also, in one or more embodiments of the invention, a CRP platform can encompass the use of one or more legacy applications, software as a service (SaaS), infrastructure as a service (IaaS), platform as a service (PaaS), integration, on premise software, etc.

Figure 5:
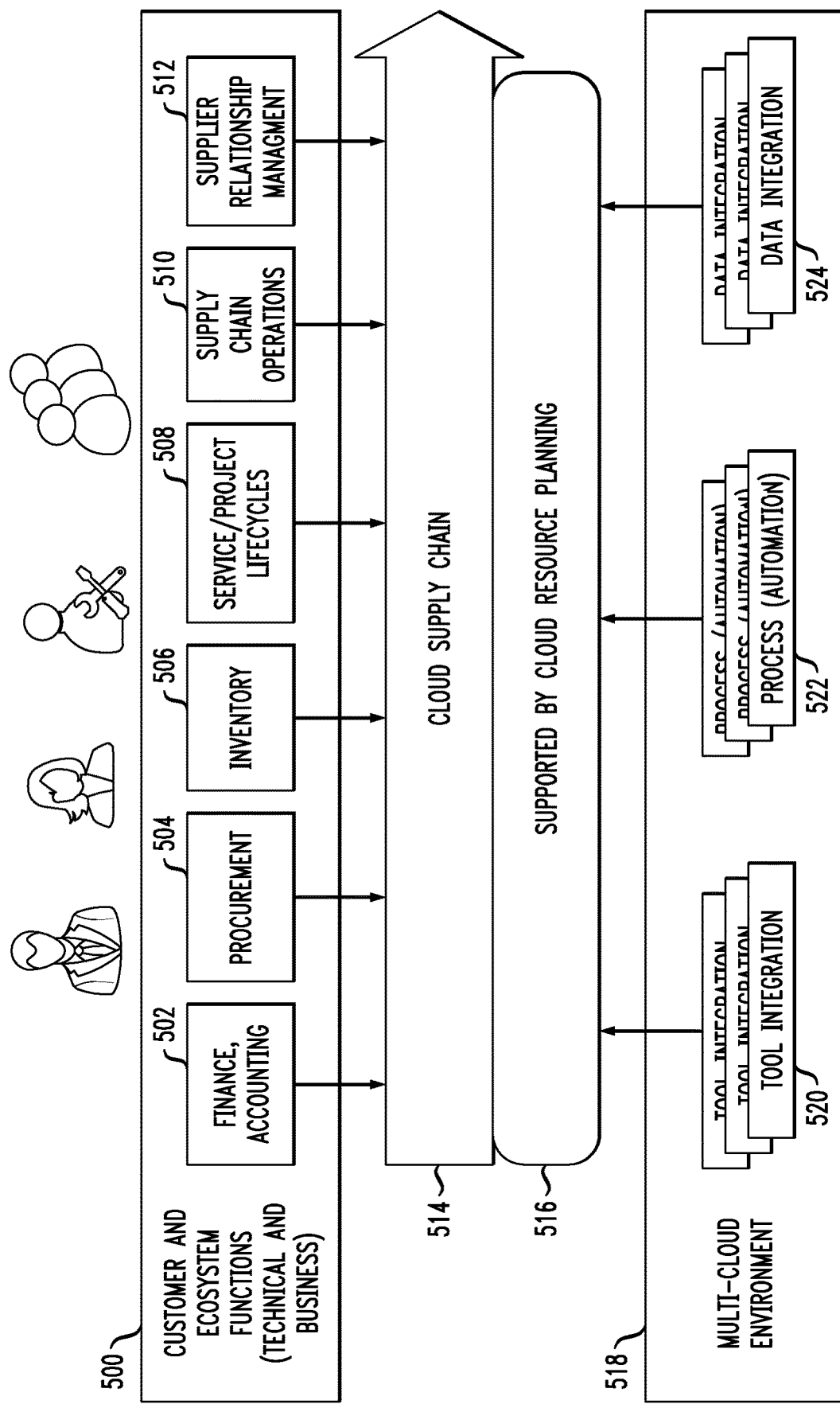
FIG. 5 shows supply chain aspects of cloud resource planning in another illustrative embodiment.

FIG. 5 shows supply chain aspects of cloud resource planning in another illustrative embodiment. By way of illustration, FIG. 5 depicts a collection of example customer and ecosystem functions 500 such as finance and accounting functions 502, procurement functions 504, inventory functions 506, service and/or project lifecycle functions 508, supply chain operations 510, supplier relationship management functions 512, etc. Such functions 500 are incorporated into a cloud supply chain 514, which can be supported by a CRP platform 516. Specifically, the CRP platform 516 can help an organization compose, execute, monitor, manage and optimize its cloud supply chain 514, as well as procurement, inventory, finance, service lifecycle, projects, human resources and other components of a service fulfillment through a common dashboard. The CRP platform 516 can serve as a service entry point for business and technical enterprise roles, integrating the customer and ecosystem functions 500 with tools 520, automated processes 522, and data 524 from a multi-cloud environment 518. Such a multi-cloud environment 518 can include, for example, an enterprise cloud and one or more public clouds.

Figure 6:
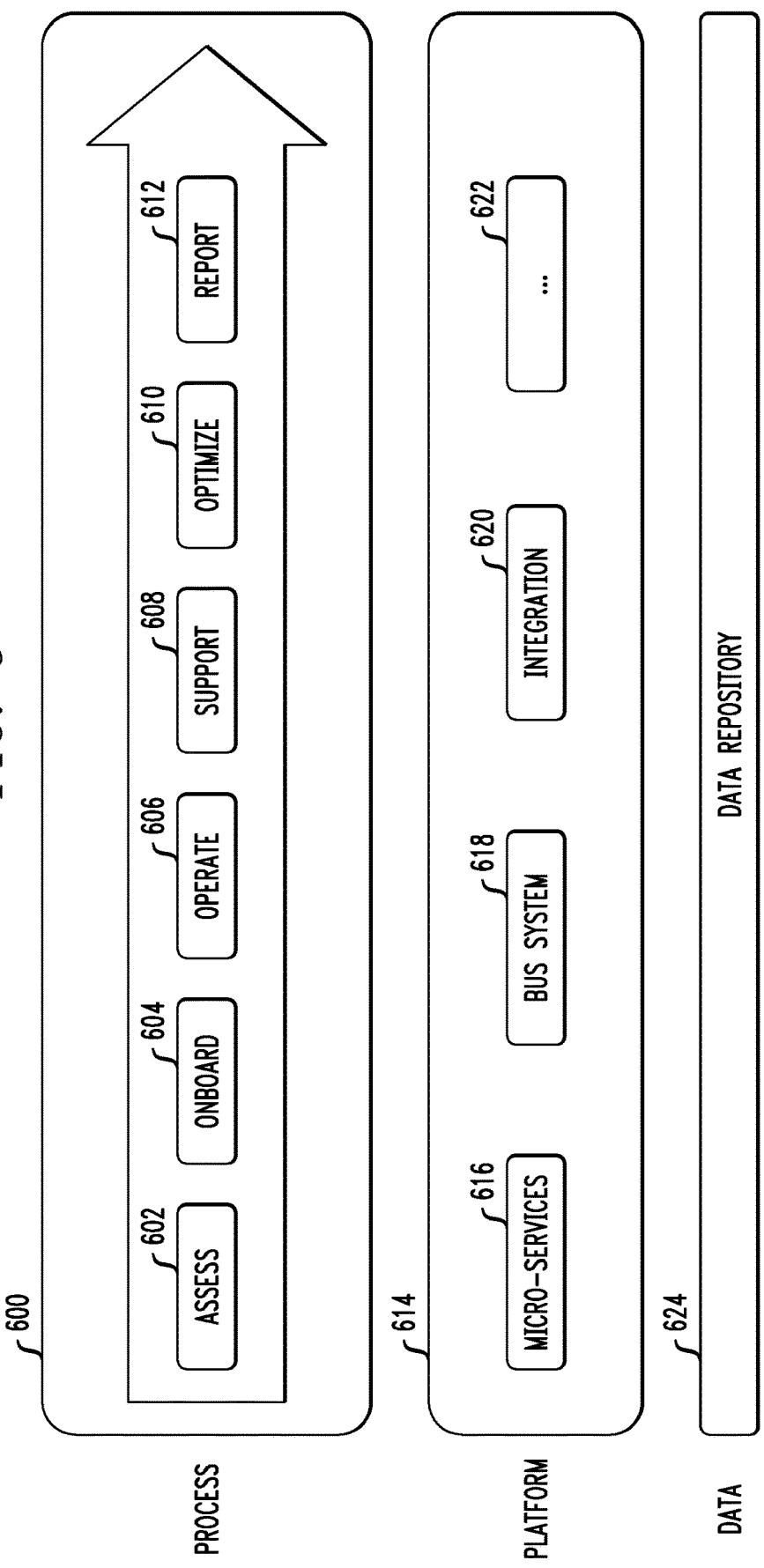
FIG. 6 shows a system view of cloud resource planning in an illustrative embodiment.

FIG. 6 shows a system view of cloud resource planning in an illustrative embodiment. By way of illustration, FIG. 6 depicts a process layer 600, a platform layer 614, and a data layer 624. The process layer 600, which can include, for example, an assessment process 602, an onboarding process 604, an operation process 606, a support process 608, an optimization process 610, and a reporting process 612, can carry out intelligent process handling via automation. The platform layer 614 can include micro-services 616, communication via a bus system 618, a full tool landscape integration 620, and one or more additional components 622. Further, as illustrated, the data layer 624 can include a data repository (from across the supply chain, for example) derived from one or more systems and smart agents.

The platform layer 614 can also allow for catalog functions, which enable an enterprise to select one or more service providers based on capability, rating, successful deployments, etc. In one or more embodiments of the invention, such a catalog of offerings is compliant with one or more enterprise parameters and/or requirements, and allows for the enterprise to selectively show offerings based on one or more end-customer attributes. Such offerings can be priced by allowing pricing engines to perform pricing in real-time via a service interface. Additionally, as detailed herein, similar to service modules, the usage of technical integration adapters for cloud resources can be catalog-based and ensure compatibility across a service fulfillment. In at least one embodiment of the invention, a logical cloud service check ensures that the technical and business processes across the service provisioning cycle can be supported by the chosen service modules, and as that they are supported by the chosen cloud resources as integrated through the technical adapters.

Figure 7:
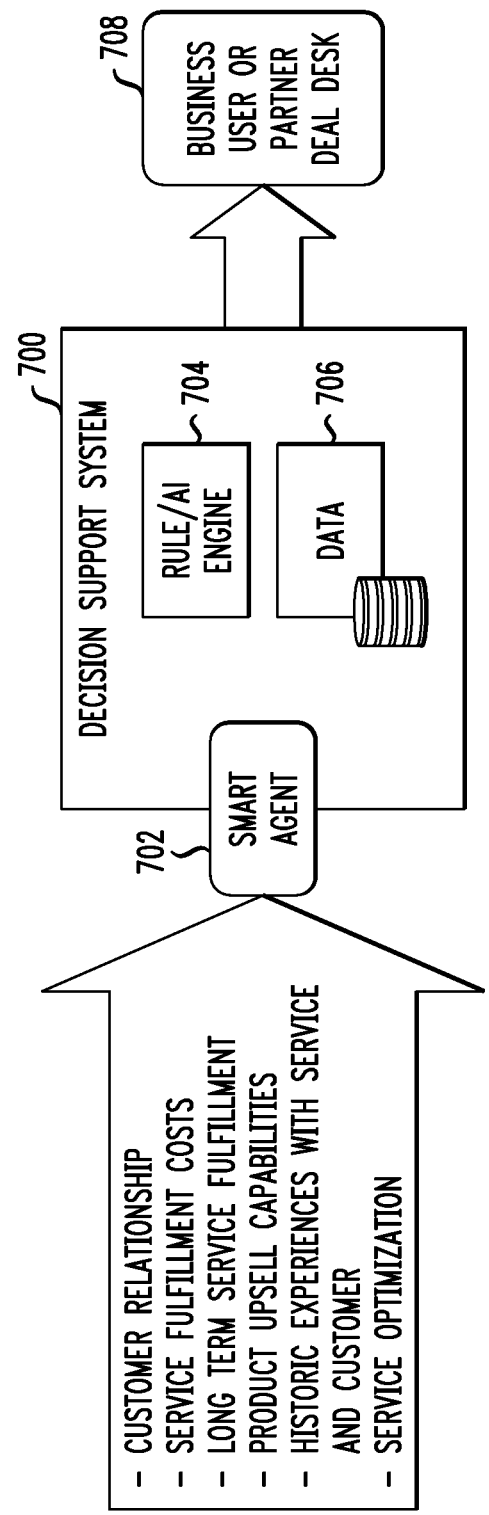
FIG. 7 shows a decision support system overview in an illustrative embodiment.

FIG. 7 shows a decision support system overview in an illustrative embodiment. As depicted by FIG. 7, one or more embodiments of the invention include combining technology and business views of a service offering during sales cycles via smart agent 702 to implement a decision support system 700, which includes data repositories 706 and rule and/or AI engines 704 to generate outputs for a business end-user or partner deal desk 708. Inputs gathered by the smart agent 702 can include, for example, customer relationship information, cost information, long-term service and product upsell capabilities, historic experiences and related cost data, as well as service optimization for a particular deal situation. An example problem that can be solved with the system 700 depicted in FIG. 7 can include margin analysis during sales cycle. The system 700 can utilize information and/or inputs such as noted above, and build a proper basis for decision support via the one or more engines 704. In compiling the noted information, the smart agent 702 can ingest historic data and extrapolate into future situations.

As additionally detailed herein, a smart agent 702 can include a deep learning agent, a voice assist agent, a data augmentation agent, a data automation agent, etc. Accordingly, smart agent 702 can be a software-based agent that ingests data through dynamically assigned characteristics, extracts data points and metrics from raw provided inputs, and filters and normalizes data points prior to sending to a common repository. Such a common repository can include a software-based repository which houses data provided by smart agents, and generates data via a machine learning-embedded layer to set back into repository. Additionally such a repository can dynamically generate reports with the ability to model various outcomes through version modeling.

Figure 8:
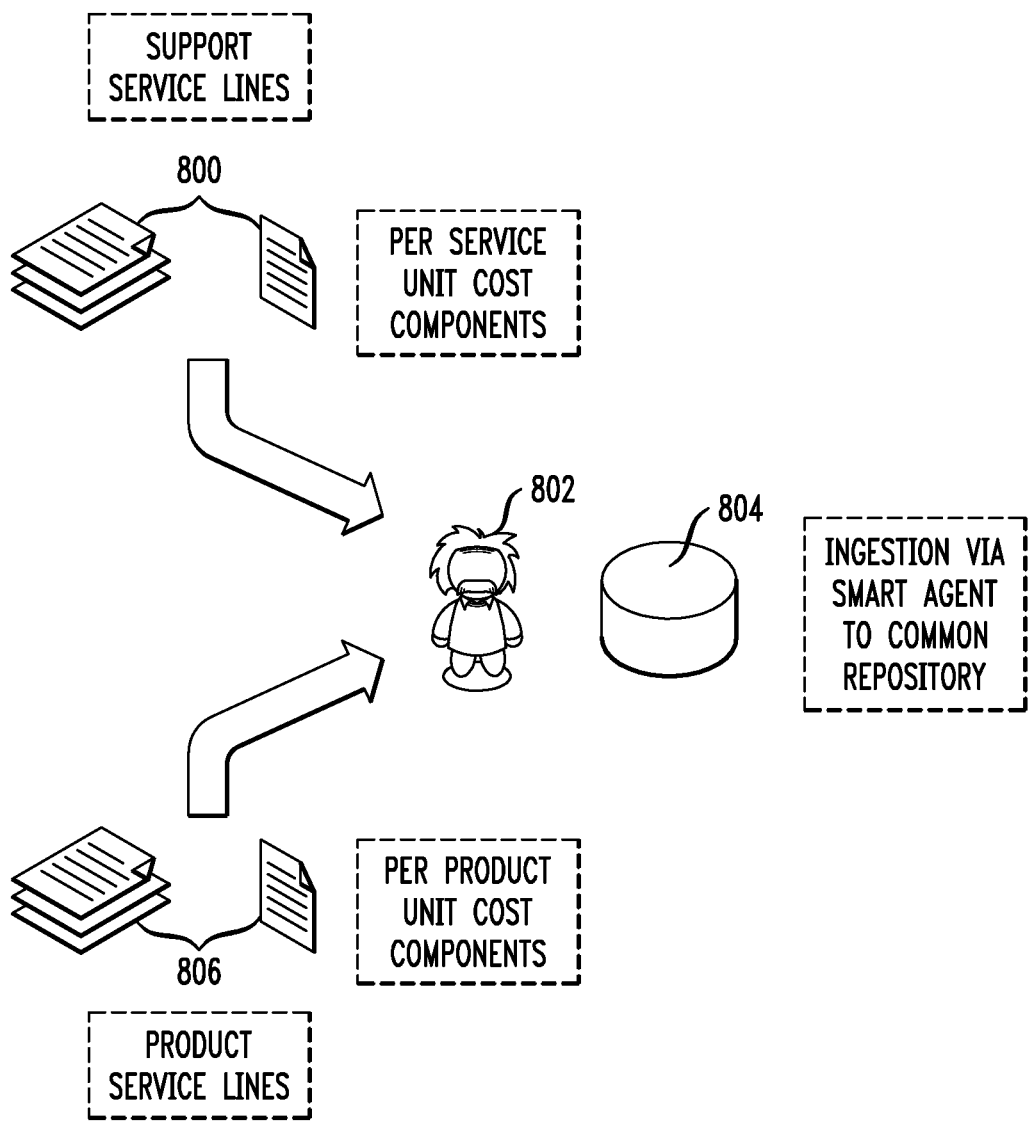
FIG. 8 shows a cost component dataset ingestion workflow in an illustrative embodiment.

FIG. 8 shows a cost component dataset ingestion workflow in an illustrative embodiment. By way of illustration, FIG. 8 depicts support service lines 800 (with per service unit cost components) and product service lines 806 (with per product unit cost components), which are ingested by a smart agent 802 and provided to a common repository 804.

Figure 9:
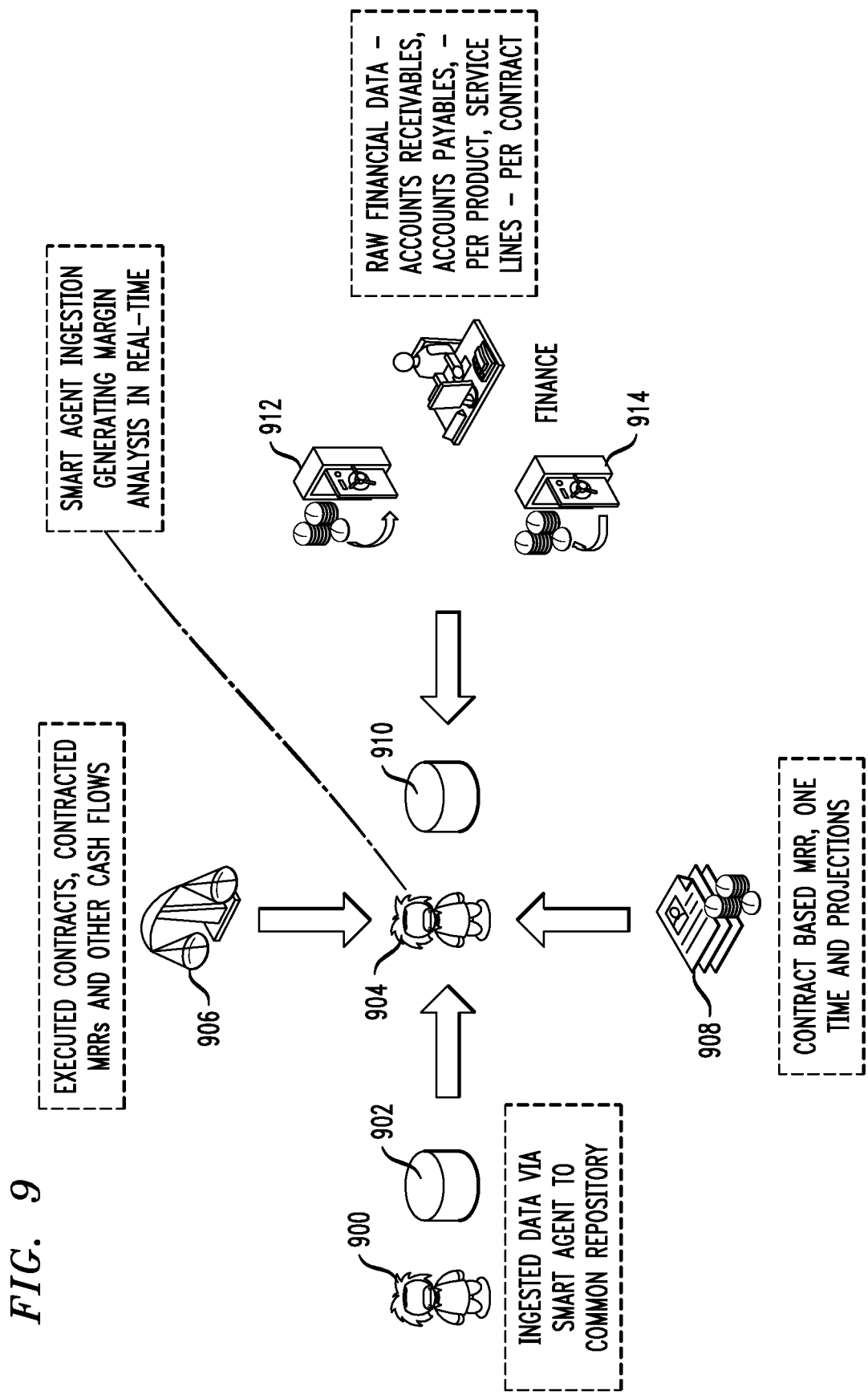
FIG. 9 shows revenue and margin analysis automation and augmentation in an illustrative embodiment.

FIG. 9 shows revenue and margin analysis automation and augmentation in an illustrative embodiment. By way of illustration, FIG. 9 depicts data, ingested by a smart agent 900 and provided to a common repository 902, sent to smart agent 904, which also gathers information (insets) 906 pertaining to executed contracts, contracted monthly recurring revenues (MRRs) and other cash flows, information (insets) 908 pertaining to contract-based MRRs and projections, and information (insets) 912 and 914 pertaining to raw financial data (such as accounts receivable, accounts payable, per-product line data, per-service line data, per-contract data, etc.). Based on such information (insets), the smart agent 904 can generate (and provide to common repository 910) a margin analysis in real-time.

Figure 10:
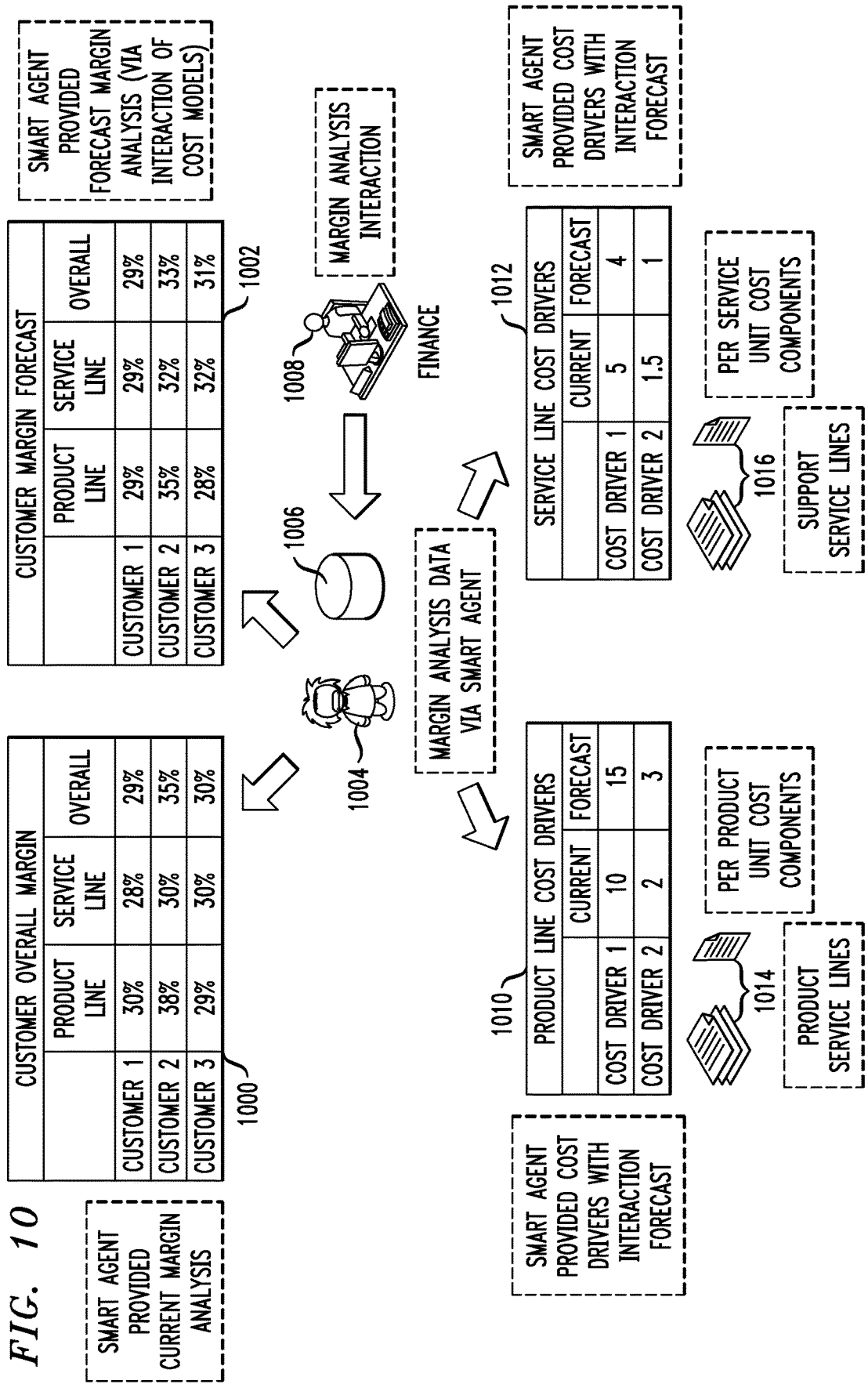
FIG. 10 shows example user interactions in an illustrative embodiment.

FIG. 10 shows example user interactions in an illustrative embodiment. By way of illustration, FIG. 10 depicts sample dashboard views for cost components, cost drivers, margin analysis and forecast interaction via smart agent 1004. Specifically, FIG. 10 depicts a margin analysis provided by a finance user 1008 to the smart agent 1004 (which houses the analysis in a common repository 1006). The smart agent 1004, in accordance with one or more embodiments of the invention, can generate and output a dashboard view 1000 of the current margin analysis, a dashboard view 1002 of a forecasted margin analysis (via interaction of cost models), a dashboard view 1010 of cost drivers with an interaction forecast for product service lines 1014 per product unit cost components, and a dashboard view 1012 of cost drivers with an interaction forecast for support service lines 1016 and per service unit cost components.

Figure 11:
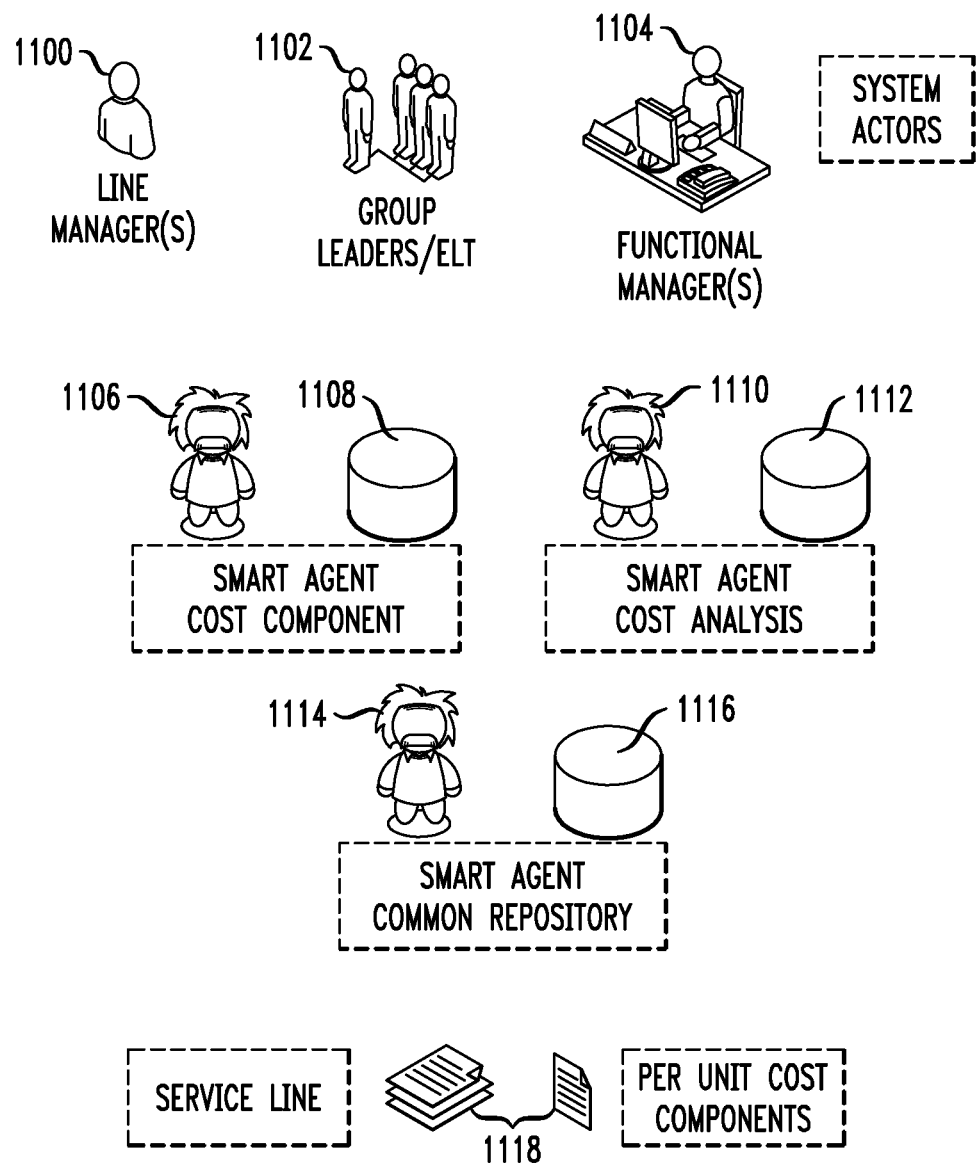
FIG. 11 shows an interactive cost and analysis component overview in an illustrative embodiment.

FIG. 11 shows an interactive cost and analysis component overview in an illustrative embodiment. By way of illustration, FIG. 11 depicts a sample interaction of groups, actors, and smart agent components for a cost and analysis overview. The depicted system actors include line manager(s)

1100, group leaders and/or ELT 1102, and functional managers 1104. The smart agent components depicted in FIG. 11 include a cost component smart agent 1106 (with corresponding common repository 1108), a smart agent cost analysis smart agent 1110 (with corresponding common repository 1112), and a common repository smart agent 1114 (with a corresponding common repository 1116). Additionally, FIG. 11 also depicts a service line 1118 with per unit cost components.

Referring now to FIG. 12A and FIG. 12B (collectively referred to herein as FIG. 12), another illustrative embodiment is shown. In this embodiment, pseudocode 1200 is executed by or under the control of a processing platform, such as processing platform 106, or another type of processing platform. For example, the pseudocode 1200 may be viewed as comprising a portion of a software implementation of at least part of processing platform 106 of the FIG. 1 embodiment.

The pseudocode 1200 illustrates a process for handling the optimization identification of cost components associated with a service component activity.

It is to be appreciated that this particular pseudocode shows just one example implementation of a process for handling the optimization identification of cost components associated with a service component activity, and alternative implementations of the process can be used in other embodiments.

Figure 13:
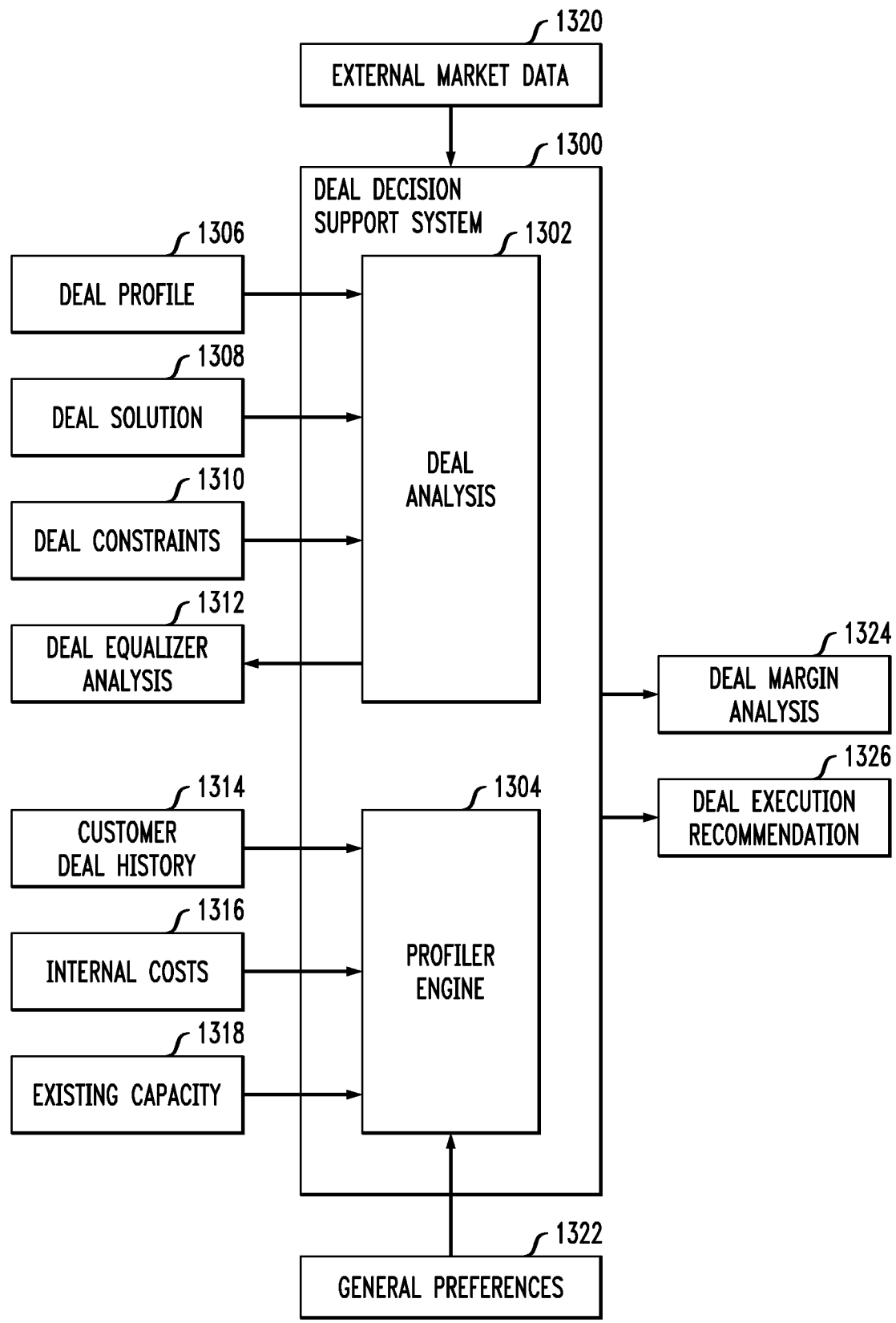
FIG. 13 shows an example deal decision support system in an illustrative embodiment.

FIG. 13 shows the various attributes which ingress into a deal decision support system 1300, and identifies example egress attributes of the deal decision support system 1300. The depicted input attributes include a deal profile 1306, a deal solution 1308, deal constraints 1310, customer deal history 1314, internal costs 1316 and existing capacity 1318. The decision support system 1300, via a deal analysis component 1302 and a profiler engine 1304, and based on additional inputs in the form of external market data 1320 and general preferences 1322, generates a deal margin analysis rating 1324, in which output can be fed into deal equalizer analysis component 1312 to further tune an outcome of the deal decision support system 1300. Based on such tuning, the deal decision support system 1300 can generate and output a deal execution recommendation ranking and/or value 1326.

Figure 14:
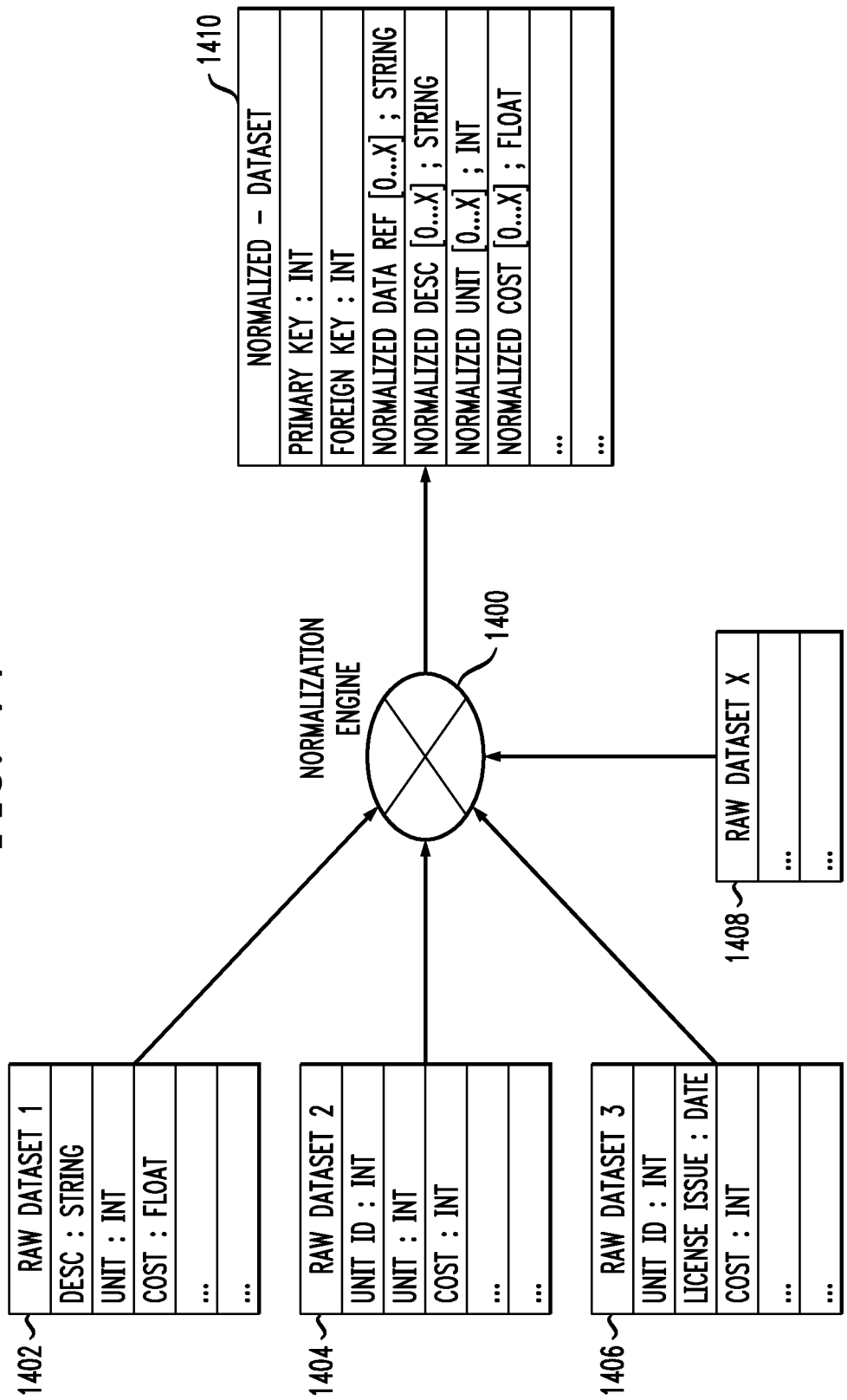
FIG. 14 shows an example normalization approach for normalizing various raw data into a common data format in an illustrative embodiment.

FIG. 14 shows an example normalization approach for normalizing various raw data into a common data format in an illustrative embodiment. By way of illustration, FIG. 14 depicts a normalization engine 1400, which takes raw data sets 1402, 1404, 1406 and 1408 as input, and outputs a normalized data set 1410, wherein the normalized data set 1410 includes all of the input raw data sets normalized into a common data format.

As noted herein, the operation of the information processing system 100 is described in further detail with reference to the flow diagram of the example embodiment of FIG. 15. The process as shown includes steps 1500 through 1512, and is suitable for use in the system 100 but is more generally applicable to other systems comprising a processing platform having cloud infrastructure representation functionality. Accordingly, references to components of the embodiment of FIG. 1 in the process description below should not be viewed as limiting in any way, as the disclosed process steps can be applied in a wide variety of other types of information processing systems.

In step 1500, at least one processing platform is configured to include a plurality of processing devices each comprising a processor coupled to a memory. In the context of the FIG. 1 embodiment, information processing system 100 comprises multiple processing platforms 106 and 106' as illustrated in the figure. The one or more additional processing platforms 106' may be configured in substantially the same manner as the processing platform 106. Each such processing platform comprises virtual resources for use by client applications.

In step 1502, at least a portion of at least a first cloud-based system are implemented within the processing platform. For example, with reference to the FIG. 1 embodiment, virtual resources 110 of cloud-based system 112 are implemented within the processing platform 106. As mentioned previously, such virtual resources (or cloud system portion(s)) illustratively comprise containers, virtual machines or combinations thereof. For example, in the context of the FIG. 1 embodiment, the virtual resources may comprise a plurality of containers allocable to respective client applications of the client devices 102 under the control of the cloud-based system 112. As another example, the virtual resources may comprise a plurality of virtual machines allocable to respective ones of the client applications of the client devices 102 under the control of the cloud-based system 112. Numerous other arrangements of virtual resources of various types and combinations can be utilized in other embodiments. For example, the virtual resources can include a plurality of virtual machines and a plurality of containers configured to run on at least a subset of the virtual machines.

In step 1504, one or more datasets and one or more workflows related to the one or more datasets generated in connection with at least one service delivery operation of one or more service provider organizations are ingested in real-time. Such a step can be carried out, for example, by smart agent engine 114 in the FIG. 1 embodiment. The one or more datasets can represent, for example, data pertaining to one or more cost values associated with the at least one service delivery operation, data pertaining to one or more revenue values associated with the at least one service delivery operation, and/or data pertaining to one or more profit margin values associated with the at least one service delivery operation. Additionally, the service delivery operation of the one or more service provider organizations can include, for example, a multi-cloud, multi-vendor service delivery operation.

In step 1506, the ingested datasets and the ingested workflows are normalized into a given format. Such a step can also be carried out, for example, by smart agent engine 114 in the FIG. 1 embodiment. In at least one embodiment of the invention, the smart agent engine 114 can include a deep learning agent, a voice assist agent, a data augmentation agent, and/or a data automation agent.

In step 1508, one or more metrics related to the at least one service delivery operation are automatically generated by applying one or more machine learning algorithms to the normalized datasets and the normalized workflows. Such a step can be carried out, for example, by analytics engine 116 in the FIG. 1 embodiment. The one or more metrics can include, for example, one or more time-dependent metrics and/or one or more context-dependent metrics.

In step 1510, an enhanced version of at least one of the normalized datasets and normalized workflows is automatically generated by encompassing at least one of one or more insets and one or more outflows based on the one or more generated metrics and at least one of one or more deep learning algorithms and one or more machine learning algorithms. Such a step can also be carried out, for example, by analytics engine 116 in the FIG. 1 embodiment. In at least one embodiment of the invention, the analytics engine 116 can be further configured to determine one or more unrealized efficiencies in at least one of the normalized datasets and normalized workflows based on one or more desired targets associated with the one or more service provider organizations and a forecast of at least one objective defined by the one or more service provider organizations for a given temporal duration.

Also, in one or more embodiments of the invention, the enhanced version of the normalized datasets and/or normalized workflows can represent, for example, a consumer consumption increase associated with the at least one service delivery operation and/or a service provider cost reduction associated with the at least one service delivery operation.

In step 1512, the ingested datasets, the ingested workflows, and the enhanced version of at least one of the normalized datasets and normalized workflows are output to at least one user. Such a step can be carried out, for example, by decision support module 118 in the FIG. 1 embodiment. In at least one embodiment of the invention, the decision support module 118 can be further configured to generate, based on one or more service delivery operation attributes, a service delivery operation margin analysis rating. Service delivery operation attributes can include, for example, a service delivery operation profile, a service delivery operation solution, one or more service delivery operation constraints, a customer service delivery operation history, one or more internal service provider organization costs, and/or existing service provider organization capacity. Additionally, the decision support module 118 can be further configured to generate, based on the service delivery operation margin analysis rating, at least one of a service delivery operation execution recommendation ranking and a service delivery operation execution recommendation value.

Further, in at least one embodiment of the invention, the decision support module 118 can be additionally configured to enable one or more third-party actors to interact with the processing platform as well as to provide an interactive view of the at least one service delivery operation to one or more actors associated with the at least one service delivery operation, wherein the interactive view is customized for each of the actors based on at least one of one or more roles and one or more permissions attributed to each of the actors.

Figure 15:
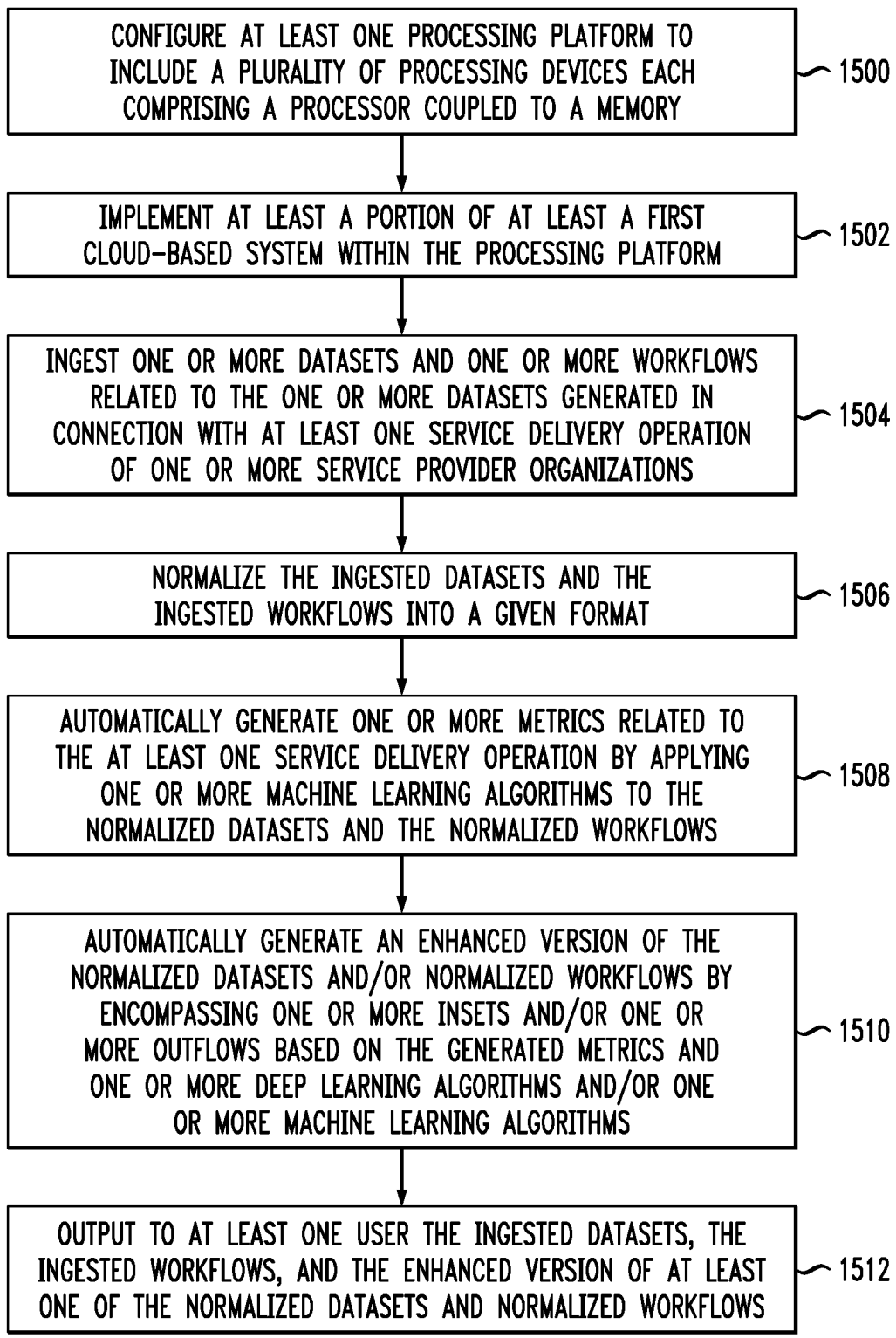
FIG. 15 is a flow diagram of a process for delivering real-time decision support mechanisms in an illustrative embodiment.

The techniques depicted in FIG. 15 can also include storing, via a repository associated with the processing platform, the ingested datasets and the ingested workflows The particular processing operations and other system functionality described in conjunction with the flow diagram of FIG. 15 are therefore presented by way of illustrative example only, and should not be construed as limiting the scope of the disclosure in any way. Alternative embodiments can use other types of processing operations involving cloud infrastructure representation. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to carry out the techniques of one or more embodiments of the invention detailed herein.

Functionality such as that described in conjunction with the flow diagram of FIG. 15 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of delivering enterprise cloud resources and services using composable business and technical processes as disclosed herein can provide a number of significant advantages relative to conventional arrangements.

For example, some embodiments can provide augmentation and automation of data analysis through the use of deep learning and machine learning algorithms. Also, one or more embodiments can provide forecasting capabilities to generate a resulting analysis intended to increase consumption of service(s) and lower service provider costs.

Such arrangements overcome the difficulties that would otherwise be associated with existing approaches limited to gathering datasets in disparate forms through homegrown approaches or single-aspect applications.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 16 and 17. Although described in the context of system 100, these platforms may also be used to implement at least portions of other information processing systems in other embodiments.

Figure 16:
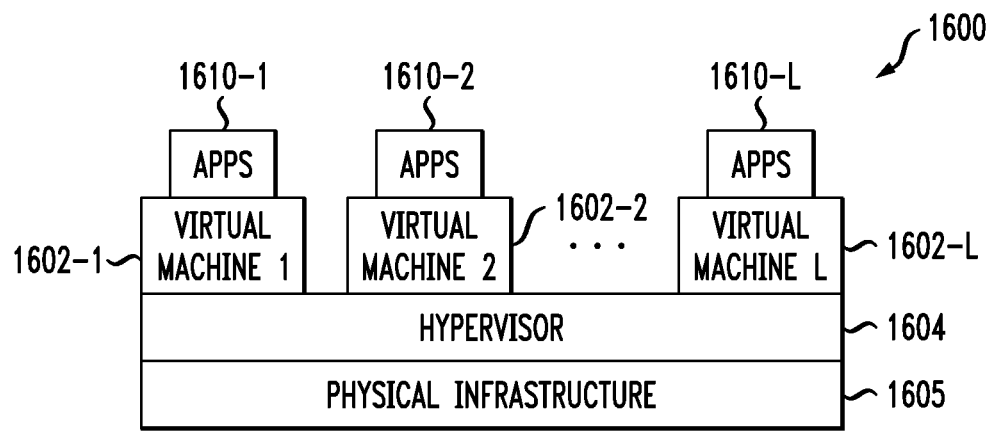
FIGS. 16 and 17 show examples of processing platforms that may be utilized to implement at least a portion of an information processing system in illustrative embodiments.
Figure 17:
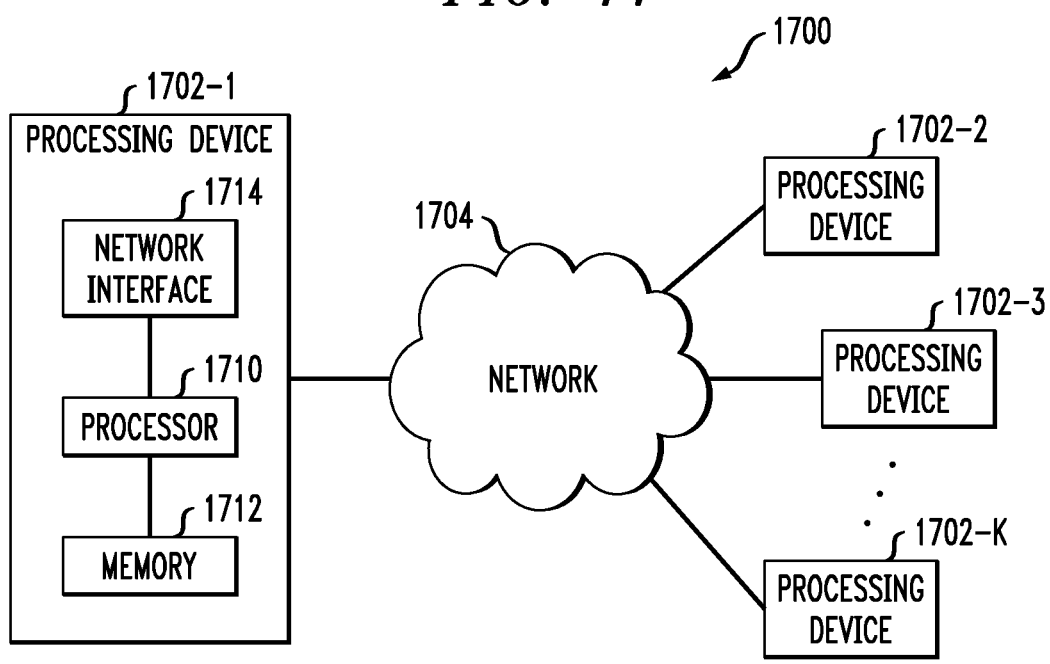

FIG. 16 shows an example processing platform comprising cloud infrastructure 1600. The cloud infrastructure 1600 comprises a combination of physical and virtual processing resources that may be utilized to implement at least a portion of the information processing system 100. The cloud infrastructure 1600 comprises virtual machines (VMs) 1602-1, 1602-2, . . . 1602-L implemented using a hypervisor 1604. The hypervisor 1604 runs on physical infrastructure 1605. The cloud infrastructure 1600 further comprises sets of applications 1610-1, 1610-2, . . . 1610-L running on respective ones of the virtual machines 1602-1, 1602-2, . . . 1602-L under the control of the hypervisor 1604.

Although only a single hypervisor 1604 is shown in the embodiment of FIG. 16, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 1604 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1600 shown in FIG. 16 may represent at least a portion of one processing platform. Another example of such a processing platform is processing platform 1700 shown in FIG. 17.

The processing platform 1700 in this embodiment comprises a portion of system 100 and includes a plurality of processing devices, denoted 1702-1, 1702-2, 1702-3, . . . 1702-K, which communicate with one another over a network 1704.

The network 1704 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1702-1 in the processing platform 1700 comprises a processor 1710 coupled to a memory 1712.

The processor 1710 may comprise a microprocessor, a microcontroller, an application-specific integrated circuit (ASIC), a field-programmable gate array (FPGA) or other type of processing circuitry, as well as portions or combinations of such circuitry elements.

The memory 1712 may comprise random access memory (RAM), read-only memory (ROM) or other types of memory, in any combination. The memory 1712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1702-1 is network interface circuitry 1714, which is used to interface the processing device with the network 1704 and other system components, and may comprise conventional transceivers.

The other processing devices 1702 of the processing platform 1700 are assumed to be configured in a manner similar to that shown for processing device 1702-1 in the figure.

Again, the particular processing platform 1700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide enterprise cloud resources and services using composable business and technical processes. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing platform comprising a plurality of processing devices each comprising a processor coupled to a memory;
   the at least one processing platform being configured:
   to implement at least a portion of at least a first cloud-based system;
   to ingest, in real-time, one or more datasets and one or more workflows related to the one or more datasets generated in connection with at least one service delivery operation of one or more service provider organizations; and
   to normalize the ingested datasets and the ingested workflows into a given format;
   to automatically generate one or more metrics related to the at least one service delivery operation by applying one or more machine learning algorithms to the normalized datasets and the normalized workflows; and
   to automatically generate an enhanced version of at least one of the normalized datasets and normalized workflows by encompassing at least one of one or more insets and one or more outflows based on the one or more generated metrics and at least one of one or more deep learning algorithms and one or more machine learning algorithms;
   to generate, based at least in part on (i) the enhanced version of at least one of the normalized datasets and the normalized workflows and (ii) one or more service delivery operation attributes, at least one service delivery operation margin analysis rating for the at least one service delivery operation of the one or more service provider organizations; and
   to output, to at least one user, the enhanced version of at least one of the normalized datasets and normalized workflows, and the at least one service delivery operation margin analysis rating.

2. The apparatus of claim 1, wherein the at least one processing platform is further configured to generate, based on the service delivery operation margin analysis rating, at least one of a service delivery operation execution recommendation ranking and a service delivery operation execution recommendation value.

3. The apparatus of claim 1, wherein the one or more service delivery operation attributes comprises at least one of a service delivery operation profile, a service delivery operation solution, one or more service delivery operation constraints, a customer service delivery operation history, one or more internal service provider organization costs, and existing service provider organization capacity.

4. The apparatus of claim 1, wherein the one or more datasets represent at least one of data pertaining to one or more cost values associated with the at least one service delivery operation, data pertaining to one or more revenue values associated with the at least one service delivery operation, and data pertaining to one or more profit margin values associated with the at least one service delivery operation.

5. The apparatus of claim 1, wherein the at least one service delivery operation of the one or more service provider organizations comprises a multi-cloud, multi-vendor service delivery operation.

6. The apparatus of claim 1, wherein the at least one processing platform is further configured to determine one or more unrealized efficiencies in at least one of the normalized datasets and normalized workflows based on one or more desired targets associated with the one or more service provider organizations and a forecast of at least one objective defined by the one or more service provider organizations for a given temporal duration.

7. The apparatus of claim 1, wherein the one or more metrics comprise at least one of one or more time-dependent metrics and one or more context-dependent metrics.

8. The apparatus of claim 1, wherein the enhanced version of at least one of the normalized datasets and normalized workflows represents at least one of a consumer consumption increase associated with the at least one service delivery operation and a service provider cost reduction associated with the at least one service delivery operation.

9. The apparatus of claim 1, wherein the at least one processing platform is further configured to enable one or more third-party actors to interact with the at least one processing platform.

10. The apparatus of claim 1, wherein the at least one processing platform is further configured to provide an interactive view of the at least one service delivery operation to one or more actors associated with the at least one service delivery operation, wherein the interactive view is customized for each of the actors based on at least one of one or more roles and one or more permissions attributed to each of the actors.

11. The apparatus of claim 1, wherein the at least one processing platform further comprises a repository configured to store the ingested datasets and the ingested workflows.

12. A method comprising steps of:
ingesting, in real-time, one or more datasets and one or more workflows related to the one or more datasets generated in connection with at least one service delivery operation of one or more service provider organizations;
normalizing the ingested datasets and the ingested workflows into a given format;
automatically generating one or more metrics related to the at least one service delivery operation by applying one or more machine learning algorithms to the normalized datasets and the normalized workflows;
automatically generating an enhanced version of at least one of the normalized datasets and normalized workflows by encompassing at least one of one or more insets and one or more outflows based on the one or more generated metrics and at least one of one or more deep learning algorithms and one or more machine learning algorithms;
generating, based at least in part on (i) the enhanced version of at least one of the normalized datasets and the normalized workflows and (ii) one or more service delivery operation attributes, at least one service delivery operation margin analysis rating for the at least one service delivery operation of the one or more service provider organizations; and
outputting, to at least one user, the enhanced version of at least one of the normalized datasets and normalized workflows, and the at least one service delivery operation margin analysis rating;
wherein the method is implemented in at least one processing platform configured to include a plurality of processing devices each comprising a processor coupled to a memory; and
wherein the at least one processing platform is configured to implement at least a portion of at least a first cloud-based system.

13. The method of claim 12, further comprising:
generating, based on the service delivery operation margin analysis rating, at least one of a service delivery operation execution recommendation ranking and a service delivery operation execution recommendation value.

14. The method of claim 12, further comprising:
determining one or more unrealized efficiencies in at least one of the normalized datasets and normalized workflows based on one or more desired targets associated with the one or more service provider organizations and a forecast of at least one objective defined by the one or more service provider organizations for a given temporal duration.

15. The method of claim 12, further comprising:
providing an interactive view of the at least one service delivery operation to one or more actors associated with the at least one service delivery operation, wherein the interactive view is customized for each of the actors based on at least one of one or more roles and one or more permissions attributed to each of the actors.

16. A computer program product comprising a non-transitory processor-readable storage medium having stored therein program code of one or more software programs, wherein the program code when executed by a at least one processing platform comprising a plurality of processing devices causes the at least one processing platform:
to ingest, in real-time, one or more datasets and one or more workflows related to the one or more datasets generated in connection with at least one service delivery operation of one or more service provider organizations;
to normalize the ingested datasets and the ingested workflows into a given format;
to automatically generate one or more metrics related to the at least one service delivery operation by applying one or more machine learning algorithms to the normalized datasets and the normalized workflows;
to automatically generate an enhanced version of at least one of the normalized datasets and normalized workflows by encompassing at least one of one or more insets and one or more outflows based on the one or more generated metrics and at least one of one or more deep learning algorithms and one or more machine learning algorithms;
to generate, based at least in part on (i) the enhanced version of at least one of the normalized datasets and the normalized workflows and (ii) one or more service delivery operation attributes, at least one service delivery operation margin analysis rating for the at least one service delivery operation of the one or more service provider organizations; and
to output, to at least one user, the enhanced version of at least one of the normalized datasets and normalized workflows, and the at least one service delivery operation margin analysis rating;
wherein the at least one processing platform is configured to implement at least a portion of at least a first cloud-based system.

17. The computer program product of claim 16, wherein the enhanced version of at least one of the normalized datasets and normalized workflows represents at least one of a consumer consumption increase associated with the at least one service delivery operation and a service provider cost reduction associated with the at least one service delivery operation.

18. The computer program product of claim 16, wherein the program code further causes the at least one processing platform:
to generate, based on the service delivery operation margin analysis rating, at least one of a service delivery operation execution recommendation ranking and a service delivery operation execution recommendation value.

19. The computer program product of claim 16, wherein the program code further causes the at least one processing platform:
to provide an interactive view of the at least one service delivery operation to one or more actors associated with the at least one service delivery operation, wherein the interactive view is customized for each of the actors based on at least one of one or more roles and one or more permissions attributed to each of the actors.

20. The method of claim 12, wherein the enhanced version of at least one of the normalized datasets and normalized workflows represents at least one of a consumer consumption increase associated with the at least one service delivery operation and a service provider cost reduction associated with the at least one service delivery operation.

* * * * *

UNITED STATES PATENT AND TRADEMARK OFFICE
CERTIFICATE OF CORRECTION

| | |
|---|---|
| PATENT NO. | : 10,846,638 B1 |
| APPLICATION NO. | : 15/798704 |
| DATED | : November 24, 2020 |
| INVENTOR(S) | : Eloy F. Macha et al. |

It is certified that error appears in the above-identified patent and that said Letters Patent is hereby corrected as shown below:

On the Title Page

Item (54) and in the Specification, Column 1, Line 1, please add "A" before "Platform Including".

In the Claims

In Claim 16, Column 21, Line 66, please delete "a" after the word "by" and before the words "at least one".

Signed and Sealed this
Twelfth Day of July, 2022

Katherine Kelly Vidal
*Director of the United States Patent and Trademark Office*